US012260451B2

(12) United States Patent
Feuerstein et al.

(10) Patent No.: US 12,260,451 B2
(45) Date of Patent: *Mar. 25, 2025

(54) METHOD AND SYSTEM FOR ELECTRONIC ADVERTISING

(71) Applicant: Black Crow AI, Inc., New York, NY (US)

(72) Inventors: Joshua Feuerstein, Brooklyn, NY (US); Richard Harris, New York, NY (US); Joshua Hartmann, Brooklyn, NY (US); Adam R. Pritchard, New York, NY (US); Arun Rajan, San Ramon, CA (US); Kurt Schrader, New York, NY (US); Jonathan Taqqu, New York, NY (US); Damon Tassone, New York, NY (US)

(73) Assignee: Black Crow AI, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,487

(22) Filed: Mar. 19, 2019

(65) Prior Publication Data
US 2019/0213669 A1 Jul. 11, 2019

Related U.S. Application Data

(63) Continuation of application No. 16/226,519, filed on Dec. 19, 2018, now Pat. No. 11,176,604, which is a
(Continued)

(51) Int. Cl.
*G06Q 30/00* (2023.01)
*G06Q 30/02* (2023.01)
(Continued)

(52) U.S. Cl.
CPC .......... *G06Q 30/08* (2013.01); *G06Q 30/02* (2013.01); *G06Q 30/0243* (2013.01);
(Continued)

(58) Field of Classification Search
CPC ............. G06Q 30/08; G06Q 30/0247; G06Q 30/0255; G06Q 30/0251; G06Q 30/02;
(Continued)

(56) References Cited

U.S. PATENT DOCUMENTS 5,323,314 A 6/1994 Baber et al.
6,034,683 A 3/2000 Mansour et al.
(Continued)

FOREIGN PATENT DOCUMENTS

EP 1 804 211 A1 7/2007
KR 10-2008-0083638 A 9/2008
(Continued)

OTHER PUBLICATIONS

International Search Report and Written Opinion for corresponding International Application No. PCT/US2010/037427 dated Jul. 28, 2010.
(Continued)

*Primary Examiner* — Meredith A Long
(74) *Attorney, Agent, or Firm* — Wolf, Greenfield & Sacks, P.C.

(57) ABSTRACT

A method of delivering advertising in an online environment includes determining a context of a user operating a client computer to interact with an e-commerce website, where the determined context representing an intent of the user to locate a product for purchase, defining a relation between one or more of a plurality of advertisements and the product based on at least one of a plurality of relevance types, and displaying, to the user, at least one of the advertisements having the relation to the product.

30 Claims, 13 Drawing Sheets

Related U.S. Application Data continuation of application No. 15/701,124, filed on Sep. 11, 2017, now Pat. No. 10,181,153, which is a continuation of application No. 12/793,920, filed on Jun. 4, 2010, now Pat. No. 9,836,784.

(60) Provisional application No. 61/184,032, filed on Jun. 4, 2009.

(51) Int. Cl.
*G06Q 30/0241* (2023.01)
*G06Q 30/0242* (2023.01)
*G06Q 30/0251* (2023.01)
*G06Q 30/08* (2012.01)

(52) U.S. Cl.
CPC ..... *G06Q 30/0247* (2013.01); *G06Q 30/0251* (2013.01); *G06Q 30/0253* (2013.01); *G06Q 30/0255* (2013.01); *G06Q 30/0269* (2013.01)

(58) Field of Classification Search
CPC ........... G06Q 30/0243; G06Q 30/0253; G06Q 30/0269
See application file for complete search history.

(56) References Cited

U.S. PATENT DOCUMENTS

| | | | |
|---|---|---|---|
| 6,236,396 B1 | 5/2001 | Jenson et al. | |
| 6,360,205 B1 | 3/2002 | Iyengar et al. | |
| 6,412,012 B1* | 6/2002 | Bieganski | G06Q 30/02 709/232 |
| 6,711,474 B1 | 3/2004 | Treyz et al. | |
| 7,130,808 B1 | 10/2006 | Ranka et al. | |
| 7,263,664 B1 | 8/2007 | Daughtrey | |
| 7,693,750 B2 | 4/2010 | Christensen | |
| 7,720,720 B1* | 5/2010 | Sharma | G06Q 30/02 705/26.7 |
| 7,806,329 B2* | 10/2010 | Dmitriev | H04H 20/103 235/383 |
| 7,895,076 B2 | 2/2011 | Kutaragi et al. | |
| 7,945,683 B1 | 5/2011 | Ambrose et al. | |
| 8,126,881 B1* | 2/2012 | Sethi | G06Q 30/02 707/723 |
| 8,249,918 B1* | 8/2012 | Biere | G06Q 30/0241 705/14.4 |
| 8,527,341 B2 | 9/2013 | Feuerstein et al. | |
| 8,527,342 B2 | 9/2013 | Feuerstein et al. | |
| 8,571,932 B2 | 10/2013 | Sharma | |
| 8,626,584 B2 | 1/2014 | van Datta et al. | |
| 8,682,736 B2* | 3/2014 | Flake | G06Q 30/02 705/26.1 |
| 9,083,853 B2 | 7/2015 | Shkedi | |
| 9,201,672 B1 | 12/2015 | Arana et al. | |
| 9,390,181 B1 | 7/2016 | Kotas | |
| 9,633,378 B1 | 4/2017 | Nath et al. | |
| 9,746,997 B2 | 8/2017 | Joshi et al. | |
| 9,836,784 B2 | 12/2017 | Feuerstein et al. | |
| 9,916,538 B2 | 3/2018 | Zadeh et al. | |
| 10,175,995 B1 | 1/2019 | Mitra | |
| 10,181,153 B2 | 1/2019 | Feuerstein et al. | |
| 10,543,851 B2 | 1/2020 | Freistadt et al. | |
| 10,699,235 B2 | 6/2020 | Hauser | |
| 10,817,914 B1 | 10/2020 | Nath et al. | |
| 11,243,675 B1 | 2/2022 | Blice et al. | |
| 11,250,474 B2 | 2/2022 | Heiser, II et al. | |
| 11,652,898 B2 | 5/2023 | Pritchard et al. | |
| 11,665,248 B2 | 5/2023 | Pritchard et al. | |
| 2002/0062245 A1* | 5/2002 | Niu | G06Q 30/0253 705/14.51 |
| 2002/0126155 A1 | 9/2002 | Lin-Hendel | |
| 2003/0055816 A1 | 3/2003 | Paine et al. | |
| 2005/0166233 A1 | 7/2005 | Beyda et al. | |
| 2005/0222971 A1 | 10/2005 | Cary | |
| 2005/0256766 A1 | 11/2005 | Garcia et al. | |
| 2006/0028917 A1 | 2/2006 | Wigginton | |
| 2006/0064411 A1 | 3/2006 | Gross et al. | |
| 2006/0122872 A1 | 6/2006 | Stevens et al. | |
| 2006/0206508 A1* | 9/2006 | Colace | G06Q 30/02 |
| 2006/0212350 A1 | 9/2006 | Ellis et al. | |
| 2007/0043613 A1 | 2/2007 | Longest | |
| 2007/0073592 A1 | 3/2007 | Perry et al. | |
| 2007/0073599 A1 | 3/2007 | Perry et al. | |
| 2007/0083429 A1 | 4/2007 | Kraft | |
| 2007/0101381 A1 | 5/2007 | Furlong et al. | |
| 2007/0136457 A1 | 6/2007 | Dai et al. | |
| 2007/0157245 A1 | 7/2007 | Collins | |
| 2007/0239517 A1* | 10/2007 | Chung | G06Q 30/02 705/14.53 |
| 2007/0244750 A1 | 10/2007 | Grannan et al. | |
| 2007/0260520 A1 | 11/2007 | Jha et al. | |
| 2008/0034314 A1 | 2/2008 | Louch et al. | |
| 2008/0082925 A1 | 4/2008 | Brush et al. | |
| 2008/0114672 A1 | 5/2008 | Yahia et al. | |
| 2008/0167924 A1 | 7/2008 | Veach | |
| 2008/0177609 A1 | 7/2008 | Grieb et al. | |
| 2008/0201220 A1 | 8/2008 | Broder et al. | |
| 2008/0255937 A1 | 10/2008 | Chang et al. | |
| 2008/0270154 A1 | 10/2008 | Klots et al. | |
| 2008/0270164 A1 | 10/2008 | Kidder et al. | |
| 2008/0281606 A1* | 11/2008 | Kitts | G06Q 30/02 705/1.1 |
| 2008/0281809 A1 | 11/2008 | Anderson et al. | |
| 2008/0288325 A1* | 11/2008 | Pavlov | G06Q 30/02 705/14.54 |
| 2009/0282343 A1 | 11/2009 | Catlin et al. | |
| 2009/0287701 A1 | 11/2009 | Breaker et al. | |
| 2010/0057560 A1 | 3/2010 | Skudlark et al. | |
| 2010/0076895 A1* | 3/2010 | Spencer | G06Q 10/0637 705/80 |
| 2010/0138291 A1 | 6/2010 | Silverman et al. | |
| 2010/0159967 A1 | 6/2010 | Pounds et al. | |
| 2010/0161605 A1 | 6/2010 | Gabrilovich et al. | |
| 2010/0223096 A1 | 9/2010 | Bosan et al. | |
| 2010/0251128 A1 | 9/2010 | Cordasco | |
| 2011/0054997 A1 | 3/2011 | Feuerstein et al. | |
| 2011/0054998 A1 | 3/2011 | Feuerstein et al. | |
| 2011/0055008 A1 | 3/2011 | Feuerstein et al. | |
| 2011/0125577 A1 | 5/2011 | Song et al. | |
| 2011/0167369 A1 | 7/2011 | Van Os | |
| 2011/0191315 A1 | 8/2011 | Neumeyer et al. | |
| 2011/0252351 A1 | 10/2011 | Sikora et al. | |
| 2011/0276396 A1 | 11/2011 | Rathod | |
| 2011/0288928 A1 | 11/2011 | Patwa et al. | |
| 2011/0307341 A1 | 12/2011 | Zohar et al. | |
| 2012/0084354 A1 | 4/2012 | Shinomoto et al. | |
| 2012/0166540 A1 | 6/2012 | Reis et al. | |
| 2013/0073400 A1 | 3/2013 | Heath | |
| 2013/0125047 A1 | 5/2013 | Levin et al. | |
| 2013/0132854 A1 | 5/2013 | Raleigh | |
| 2013/0144720 A1 | 6/2013 | Hari et al. | |
| 2013/0325832 A1 | 12/2013 | French et al. | |
| 2014/0052577 A1 | 2/2014 | Gotlieb et al. | |
| 2014/0297739 A1 | 10/2014 | Stein et al. | |
| 2015/0095145 A1 | 4/2015 | Shulman et al. | |
| 2015/0127403 A1 | 5/2015 | Petty | |
| 2015/0163256 A1 | 6/2015 | Frank | |
| 2015/0242495 A1 | 8/2015 | Goldstein et al. | |
| 2016/0057383 A1 | 2/2016 | Pattan et al. | |
| 2016/0180389 A1 | 6/2016 | Kotas | |
| 2017/0017369 A1 | 1/2017 | Kanter et al. | |
| 2017/0078922 A1 | 3/2017 | Raleigh | |
| 2017/0201850 A1 | 7/2017 | Raleigh | |
| 2017/0293419 A1 | 10/2017 | Dipin | |
| 2017/0329851 A1 | 11/2017 | Yan et al. | |
| 2017/0347164 A1 | 11/2017 | Thomas | |
| 2017/0372413 A1 | 12/2017 | Feuerstein et al. | |
| 2018/0018063 A1 | 1/2018 | Pritchard et al. | |
| 2018/0018304 A1 | 1/2018 | Pritchard et al. | |
| 2018/0285941 A1 | 10/2018 | Tricoli et al. | |
| 2019/0197611 A1 | 6/2019 | Feuerstein et al. | |
| 2019/0213670 A1 | 7/2019 | Feuerstein et al. | |
| 2019/0286682 A1 | 9/2019 | Dzumla et al. | |

(56) References Cited

U.S. PATENT DOCUMENTS

| | | |
|---|---|---|
| 2021/0211512 A1 | 7/2021 | Pritchard et al. |
| 2021/0211513 A1 | 7/2021 | Pritchard et al. |
| 2022/0277385 A1 | 9/2022 | Feuerstein et al. |

FOREIGN PATENT DOCUMENTS

| | | |
|---|---|---|
| WO | WO 2006/096768 A2 | 9/2006 |
| WO | WO 2007/127159 A2 | 11/2007 |
| WO | WO 2019/052869 A1 | 3/2019 |

OTHER PUBLICATIONS

International Preliminary Report on Patentability for corresponding International Application No. PCT/US2010/037427 mailed Dec. 15, 2011.

International Search Report and Written Opinion mailed Sep. 22, 2017 for corresponding International Application No. PPCT/US027/041915.

International Preliminary Report on Patentability for corresponding International Application No. PCT/US2017/041915 mailed Jan. 24, 2019.

European Examiner's Report for corresponding European Application No. 10784162.9 dated Aug. 31, 2016.

Extended European Search Report for corresponding European Application No. 10784162.9 dated Jun. 30, 2014.

Canadian Examiner's Report for corresponding Canadian Application No. 2,764,493 mailed Feb. 22, 2016.

Canadian Examiner's Report for corresponding Canadian Application No. 2,764,493 dated Jan. 11, 2017.

Extended European Search Report dated Oct. 9, 2019 in connection with European Application No. 19153562.4.

[No Author Listed], System, Method and Computer Program Product for Presenting an Option to Receive advertisement Content. The IP.com Prior Art Database. Nov. 29, 2006. 13 pages.

Olans et al., Federal Regulation of False Advertising. 5 B.C. Indus & Com L. Rev 704 (1964). p. 704-738.

Advertisement System, method, and computer program product (English (United States)). The IP.com Prior Art Database, Jul. 24, 2006 (Year: 2006).

Erickson et al. Ubiquitous Advertising Challenges (English), 2007 7th International Conference on Mobile Business (pp. 9-18), Aug. 4, 2008 (Year: 2008).

Hristova et al. Ad-Me: Wireless advertising adapted to the user location, device, and emotions (English), 37th Annual Hawaii International Conference on System Sciences. 2004. Proceedings of the (pp. 10pp.) Jan. 1, 2004 (Year: 2004).

Park et al., Perceived Interactivity in Online Retail Services: Approach from the Features (English). IEEE International Conference on Service Operations and Logistics, and informatics. Aug. 1, 2007. 6 pages.

Thachenkary et al., Successful product characteristics for electronic commerce: a taxonomy of transaction types (English). Forth International Workshop on Community Networking Processing. Jan. 1, 1997; 77-85.

European Examination Report dated May 10, 2023, in connection with European Application No. 19153562.4.

\* cited by examiner

METHOD AND SYSTEM FOR ELECTRONIC ADVERTISING

RELATED APPLICATIONS

This Application is a Continuation of U.S. application Ser. No. 16/226,519, filed Dec. 19, 2018, entitled "METHOD AND SYSTEM FOR ELECTRONIC ADVERTISING", which is a Continuation of U.S. application Ser. No. 15/701, 124, filed Sep. 11, 2017, entitled "METHOD AND SYSTEM FOR ELECTRONIC ADVERTISING", which is a Continuation of U.S. application Ser. No. 12/793,920, filed Jun. 4, 2010, entitled "METHOD AND SYSTEM FOR ELECTRONIC ADVERTISING", which is a Non-Provisional of Provisional (35 USC 119(e)) of U.S. Application Ser. No. 61/184,032, filed Jun. 4, 2009, entitled "METHOD AND APPARATUS FOR ELECTRONIC ADVERTISING", each of which is herein incorporated by reference in its entirety.

BACKGROUND OF INVENTION

Field of Invention

The present disclosure relates generally to Internet technologies, and more specifically, to online advertising.

Discussion of Related Art

Online advertising is one form of marketing where advertisements (ads) are distributed to users generally through a communication network such as the Internet. Advertised products include goods and services. In one typical system, a user utilizes a web browser application program on a personal computer (PC) to access a webpage by supplying a Uniform Resource Locator (URL). The webpage is provided by an online (or web) publisher. Upon accessing the webpage, an advertisement is displayed to the user within a computer interface.

Systems have been developed that display certain advertisements to a user based on information provided by the user, or based on the content of the page which the user is viewing. For example, when the user enters words, phrases, or other terms into an online search engine, advertisements related to the search terms or search results are displayed by the publisher of the web page, which typically is the search engine service. In some instances, the advertisements are chosen based on other information, such as user identification or browsing history. These types and other types of contextual advertising attempt to target the intent of the user (e.g., where the user is shopping for a particular product). Such targeted advertising is known to increase the chance of attracting interest in the advertised product, which in turn increases the value of the advertisement. Advertisers bid for placement of their ads, with the bids reflecting a monetized value of the user's intent, and pay the bid amount to the publisher if and when the ad is displayed.

SUMMARY OF INVENTION

A method and system for electronic advertising is described herein. It is appreciated that on a typical e-commerce website operated by a publisher, where certain goods and/or services are sold, a vast majority of visitors to the first website do not complete a sales transaction, which is referred to in the art as a "conversion". In fact, a typical e-commerce website has a conversion rate of 3%-5%. Thus, it is appreciated that visitors primarily use some e-commerce websites to browse and research products. For instance, visitors may research product features, price, availability, reviews, and comparison information on such websites without making any purchases. Often, after acquiring the desired information about a particular product from the website, the user will locate and purchase that product from another source, for example on another website operated by a different publisher or complete the transaction using another channel (e.g., telephone order, brick-and-mortar store).

In one example, the user may find that the e-commerce website provides a convenient place to research and/or comparison shop, but once a purchasing decision is made the user exercises his or her preference for purchasing certain products directly from a manufacturer or a trusted retailer, rather than from the publisher. Specifically, a user uses an online travel service, such as Expedia® online travel website by Expedia, Inc., to shop for airline tickets, but after locating the desired itinerary and fare, the user ultimately purchases the tickets directly from the airline and not from the Expedia website. In another example, the visitor does not find what he or she is looking for on the first website, and leaves the website without completing a transaction.

When no transaction occurs on the website, the publisher receives no revenue from the visitor. According to one aspect, it is appreciated that most e-commerce websites monetize their visitors exclusively, or almost exclusively, through transaction (or sales) revenue. In some instances, a publisher receives a stream of advertising (or media) revenue for serving ads on their website for various goods and services sold by others. The media revenue, if any, is generally used to supplement the transaction revenue. However, when the ads are for a competing (or the same) product sold by another, the publisher may be reluctant to display the ad to its visitors out of concern that such action will cannibalize sales, and thus the publisher may prefer to forgo the potential media revenue.

According to one aspect of the present disclosure, a contribution per visitor (CPV) to an e-commerce website may be determined, and this CPV may be used to determine when and if ads are displayed on an e-commerce website. According to one embodiment, CPV is a measure of the profit or net revenue received by the publisher of the website for each visitor. Such revenue may be created by sales, advertising, or both. In one example, the CPV may be based, at least in part, on the average net revenue generated by each visitor over some finite period of time, where net revenue includes transaction and/or media revenue. It is appreciated that the CPV can be improved or maximized by optimizing transaction revenue and media revenue, for example, by evaluating the effect of displaying ads on a visitor-by-visitor basis and displaying ads where the potential benefit of receiving ad revenue exceeds the potential loss in transaction revenue resulting from displaying the ad. It should be understood that the measures of determining the CPV and/or performing the benefit/cost analysis described above are merely exemplary and that other measures may be used.

It is also appreciated that the visitor's intent to purchase a particular product may be determined based on the visitor's interaction with the website, and that such intent may be monetized by, for example, allowing advertisers to bid for the opportunity to place ads that are targeted to the intent of the visitor on the website. The ads may, for example, enable the visitor to discover additional retailers, products, product substitutes, complementary products, and prices. Where the value of the media revenue (e.g., the bid amount) exceeds a threshold amount, displaying the targeted ad increases the CPV relative to the CPV where a non-targeted ad, or no ad, is displayed.

According to an embodiment of the disclosure, a method for delivering electronic advertising includes identifying an intent of a visitor interacting with an e-commerce website, determining a hurdle rate that identifies a threshold amount to be paid by an advertiser in order to deliver an advertisement to the user at the e-commerce website based on the intent, selecting an optimal advertisement from a plurality of advertisements having an advertiser bid greater than or equal to the hurdle rate, and delivering the optimal advertisement to the visitor in an interface of a client computer system. Visitor intent may include a specific intent of the visitor, for example, an intent that is resolved to a relatively high degree of granularity, such as an intent to travel to a specific city, stay at a specific hotel, travel on a certain date, or eat at a restaurant in a specific neighborhood. Specific intent may also include specific dates or ranges of dates associated with, for example, a trip. The hurdle rate may reflect the value of serving an ad to a particular visitor, given the known intent of the visitor. For example, ads targeting a specific intent may be more valuable than ads directed toward a general intent or non-targeted ads.

In addition to determining a hurdle rate based on intent, the selected advertisement may be adapted to target visitor intent (e.g., providing an offer that may satisfy the visitor's intent, such as an offer for a special rate at a hotel specified by the visitor). Further, an intent stage (or process context) of the visitor may be determined based on the visitor's interaction with the website, for example, whether the visitor is shopping (or browsing) for a product, selecting a product, or purchasing a product. The intent stage may be used to optimize the selection of ads that are displayed to the visitor.

According to another embodiment, the method of delivering electronic advertising may include receiving an advertisement request from a publisher of an e-commerce website. The advertisement request may include one or more keywords, wherein an intent of a user is based at least in part on the keywords.

The method may further include translating the advertisement request into one or more intent targets. Translating the advertisement request may include selecting each of the one or more intent targets from a plurality of normalized intent targets based on information included in the advertisement request, wherein the plurality of normalized intent targets is stored in an intent target taxonomy database. The hurdle rate may be adjusted in relation to the one or more intent targets. Determining the hurdle rate may also include adjusting the hurdle rate based on a historical average conversion rate of each of the one or more intent targets, and adjusting the hurdle rate based on an average contribution margin of a completed transaction for the one or more intent targets.

The method may further include translating the advertisement request into one or more process contexts. Translating the advertisement request may include selecting each of the one or more process contexts from a plurality of normalized process contexts based on information included in the advertisement request, wherein the plurality of normalized process contexts is stored in a process context taxonomy database. Determining the hurdle rate may also include adjusting the hurdle rate based on the one or more process contexts.

The method may further include selecting, from a plurality of advertisements, one or more candidate advertisements, wherein an optimal advertisement is selected from the one or more candidate advertisements.

It is further appreciated that it is desirable for advertisers to tailor advertising towards the specific intent of a consumer, which may be facilitated by various computer technologies. Accordingly, various embodiments of systems and methods disclosed herein may operate and occur in real-time, where visitor intent and intent stage identification, hurdle rate calculation, advertisement creation, advertisement selection and advertisement display are responsive in real-time to visitor interaction with the e-commerce website. Other aspects of the invention may also be performed in real-time. For example, advertisers may bid in real-time based on the intent, intent stage, and/or other information received from a publisher of the website, such as visitor status, visitor past purchases, and traffic source (e.g., describing how the visitor arrived at the website, such as from an affiliate website or a web browser bookmark). Such real-time bidding enables advertisers to easily direct targeted marketing campaigns toward visitors of interest to the advertiser while avoiding costs associated with less controlled advertising distribution methods.

According to another embodiment, a method for delivering electronic advertising includes identifying one or more characteristics of a visitor to an e-commerce website, determining a hurdle rate for displaying an advertisement to the visitor based at least on the characteristics, determining whether to display an advertisement based on the characteristics, and if so, selecting an advertisement based on an intent of the visitor, wherein the selected advertisement is offered by an advertiser for at least the hurdle rate, and displaying the selected advertisement to the visitor in an interface of a client computer system. For example, the characteristic of the visitor may be a high value visitor or a low value visitor. The value of the visitor may be, for example, determined based on how the visitor was acquired (e.g., through a paid search, a natural search, or an e-mail), or based on intra- and inter-session behavior of the visitor at the website. Ads selected for display may be targeted to the visitor (or not displayed at all) based on the value of the visitor, or based on other characteristics, such as whether the visitor is a registered user, a return visitor, or a loyalty program member.

According to another embodiment, a method for delivering electronic advertising includes identifying an intent of a visitor to an e-commerce website and identifying an intent stage of the visitor, selecting an advertisement from a plurality of advertisements based on the intent and the intent stage, and displaying the selected advertisements to the visitor. For example, if the intent of the visitor is to purchase a flat screen TV and the intent stage is "purchased," an ad for Blu-Ray disc players is relevant to the intent because it promotes complementary product discovery, and the ad is also relevant to the intent stage because the visitor, having purchased the TV, is likely to purchase the disc player to complement the TV.

According to another embodiment, a method for delivering electronic advertising includes determining an intent of a user interacting with an e-commerce website, providing one or more controls in a user interface of a client computer system, each of the controls being associated with an advertiser and adapted to enable the user to select one or more of the advertisers, and providing an element responsive to the input of the user that is adapted to display an advertisement from one or more of the advertisers based on the intent.

According to yet another embodiment, a method of delivering advertising in an online environment includes determining an intent of a user interacting with an e-commerce website, determining a hurdle rate, based at least on the intent of the user, that identifies a threshold amount to be bid by an advertiser in order to display an advertisement to the user interacting with the e-commerce website, selecting, from a plurality of advertisements, one or more optimal advertisements having a combined advertiser bid that exceeds the determined hurdle rate, providing one or more controls in a user interface of a client computer system, each of the one or more controls being associated with a respective advertisement of the one or more optimal advertisements and adapted to enable the user to select one or more of the one or more controls, and providing an element, responsive to an input of the user, that is adapted to display, to the user, the one or more respective advertisements selected by the user.

According to another embodiment, a method of delivering advertising in an online environment includes determining a context of a user operating a client computer to interact with an e-commerce website, the determined context representing an intent of the user to locate a product for purchase, defining a relation between one or more of a plurality of advertisements and the product based on at least one of a plurality of relevance types, and displaying, to the user, at least one of the advertisements having the relation to the product. The method may also include categorizing one or more of the plurality of advertisements according to at least one of the plurality of relevance types.

According to yet another embodiment, a method of delivering advertising in an online environment includes receiving an advertising campaign including one or more advertisements for one or more advertised products and associating the one or more advertisements with one or more keywords, wherein each of the one or more keywords represents the advertised products. The method may further include determining an intent of a user interacting with a website to purchase a product based on one or more user supplied keywords. The method may further include determining a hurdle rate, based on the intent of the user, that identifies a threshold amount to be bid by an advertiser in order to display an advertisement to the user, and displaying, to the user in an interface of a client computer, one or more of the advertisements that are associated with the user supplied keywords and that have bids that exceeds the hurdle rate. The method may further include receiving, from a publisher of the website, an advertisement request including information related to the intent of the user.

According to one aspect a distributed computer system is provided. The distributed computer system comprises: a database; a network interface; and at least one processor coupled to the database and the network interface, the at least one processor configured to perform functions associated with a website, the functions including: store, in the database, information about a user interacting with a web page of the website shown in a display of a client device; receive client activity signals generated by the client device via the network interface in real time, wherein the client activity signals correspond to real time activity of the user interacting with the web page of the website; determine a context of the user interacting with the web page of the website based on the received client activity signals, wherein the determined context includes an identification of an intent of the user to locate a product for purchase; determine in real time an indication of a likelihood that the user will complete a transaction based at least on the stored information about the user and the determined context; determine, by a decision engine, to display advertising content to the user based at least on the determined indication of the likelihood that the user will complete the transaction; and transmit, via the network interface, display signals associated with the advertising content to the client device responsive to determining to display the advertising content to the user, the display signals configured to trigger the client device to display, in real time, the advertising content in a portion of the display shown the user.

According to one embodiment, the indication of the likelihood comprises a user score and the at least one processor is configured to: compare the user score to a threshold value; segment the user into one of a first category and a second category based on a result of the comparison; determine the advertising content to display to the user responsive to segmenting the user into the first category; and determine to not display candidate advertising content to the user responsive to segmenting the user into the second category.

According to one embodiment, the indication of the likelihood comprises a user status and the at least one processor is configured to: segment the user into one of a first category and a second category based on the user status; determine the advertising content to display to the user responsive to segmenting the user into the first category; and determine to not display candidate advertising content to the user responsive to segmenting the user into the second category. According to one embodiment, the at least one processor is further configured to determine the user status based on one or more of: an indication of whether the user has previously completed a transaction on the website, an indication of whether the user is a registered user of the website, and indications of one or more sources from which the user navigated to the website.

According to one embodiment, the at least one processor is configured to: determine one or more values corresponding to one or more of the following parameters: expected transaction revenue of the user, and expected loss in transaction revenue if the user is shown the advertising content; and determine, by the decision engine, whether to display the advertising content based on the one or more values. According to one embodiment, the at least one processor is further configured to generate the advertising content based at least on the determined context. According to one embodiment, the at least one processor is further configured to generate the advertising content based at least on an indication of a likelihood that the user will select the advertising content. According to one embodiment, the at least one processor is configured to: select at least one of a plurality of advertisements based at least on the intent of the user to locate the product for purchase; and include the at least one advertisement in the advertising content.

According to one embodiment, the at least one processor is configured to generate an interactive user interface, the interactive user interface displaying the advertising content and allowing the user to locate the product and/or at least one related product for purchase from at least one content provider. According to one embodiment, the at least one processor is configured to generate the interactive user interface as a second web page. According to one embodiment, the at least one processor is further configured to: perform a search for the product and/or the at least one related product; and display search results from the at least one content provider in the interactive user interface. According to one embodiment, the interactive user interface includes at least one selection control located proximate a name of the at least one content provider and the at least one processor is configured to perform the search responsive to a user selection of the at least one selection control. According to one embodiment, receiving the client activity signals includes receiving information input by the user on the web page and the at least one processor is configured to: perform the search for the product and/or the at least one related product using the information input by the user.

According to one embodiment, the at least one processor is configured to: receive, via the network interface, user behavior data responsive to execution of program code included in one or more web pages of the website; generate a digital model of the user using the user behavior data; and compute the indication of the likelihood using the digital model. According to one embodiment, the at least one processor is configured to update the indication of the likelihood that the user will complete the transaction in real time responsive to the client activity signals. According to one embodiment, the at least one processor is configured to update the advertising content in real time responsive to the client activity signals.

According to one aspect, a computer-implemented method of delivering content in an online environment is provided. The method comprises acts of: storing, by a processor, information about a user interacting with a web page of a website shown in a display of a client device; receiving, by the processor in real time, client activity signals from the client device via a network interface, wherein the client activity signals correspond to real time activity of the user interacting with the web page; determining, by the processor, a context of the user interacting with the web page in real time based on the received client activity signals, wherein the determined context includes an intent of the user to locate a product for purchase; determining in real time, by the processor, an indication of a likelihood that the user will complete a transaction based at least on the stored information about the user and the determined context; determining, by the processor, to display advertising content to the user based at least on the determined indication of the likelihood that the user will complete the transaction; and transmitting, by the processor via the network interface, display signals associated with the advertising content to the client device responsive to determining to display the advertising content to the user, the display signals configured to trigger the client device to display, in real time, the advertising content in a portion of the display shown the user.

According to one embodiment, determining the indication of the likelihood comprises determining a user score and the method further comprises: comparing the user score to a threshold value; segmenting the user into one of a first category and a second category based on a result of the comparison; determining the advertising content to display to the user responsive to segmenting the user into the first category; and determining to not display candidate advertising content to the user responsive to segmenting the user into the second category.

According to one embodiment, determining the indication of the likelihood comprises determining a user status and the method further comprises: segmenting the user into one of a first category and a second category based on the user status; determining the advertising content to display to the user responsive to segmenting the user into the first category; and determining to not display candidate advertising content to the user responsive to segmenting the user into the second category. According to one embodiment, the method further comprises determining the user status based on one or more of: an indication of whether the user has previously completed a transaction on the website, an indication of whether the user is a registered user of the website, and indications of one or more sources from which the user navigated to the website.

According to one embodiment, the method further comprises: determining one or more values corresponding to one or more of the following parameters: expected transaction revenue of the user, and expected loss in transaction revenue if the user is shown the advertising content; and determining whether to display the advertising content based on the one or more values. According to one embodiment, the method further comprises an act of generating the advertising content based at least on the determined context. According to one embodiment, the method further comprises acts of: selecting at least one of a plurality of advertisements based at least on the intent of the user to locate the product for purchase; and including the at least one advertisement in the advertising content.

According to one embodiment, the method further comprises comprising generating an interactive user interface, the interactive user interface displaying the advertising content and allowing the user to locate the product and/or at least one related product for purchase from at least one content provider. According to one embodiment, generating the interactive user interface comprises generating a second webpage. According to one embodiment, the method further comprises acts of: performing a search for the product and/or the at least one related product; and displaying search results from the at least one content provider in the interactive user interface. According to one embodiment, the method further comprises: generating the interactive user interface to include at least one selection control located proximate a name of the at least one content provider; and performing the search responsive to a user selection of the at least one selection control.

According to one embodiment, the method further comprises acts of: receiving, via the network interface, user behavior data responsive to execution of program code included in one or more web pages of the website; generating a digital model of the user using the user behavior data; and computing the indication of the likelihood using the digital model. According to one embodiment, the method further comprises comprising updating the indication of the likelihood that the user will complete the transaction in real time responsive to the client activity signals.

According to one aspect, a non-transitory computer readable medium having stored thereon executable instructions is provided. The instructions, when executed by at least one processor, cause the at least one processor to carry out a method comprising: storing information about a user interacting with a web page of a website shown in a display of a client device; receiving, in real time, client activity signals from the client device via a network interface, wherein the client activity signals correspond to real time activity of the user interacting with the web page; determining a context of the user interacting with the web page in real time based on the received client activity signals, wherein the determined context includes an intent of the user to locate a product for purchase; determining in real time an indication of a likelihood that the user will complete a transaction based at least on the stored information about the user and the determined context; determining to display advertising content to the user based at least on the determined indication of the likelihood that the user will complete the transaction; and transmitting, via the network interface, display signals associated with the advertising content to the client device responsive to determining to display the advertising content to the user, the display signals configured to trigger the client device to display, in real time, the advertising content in a portion of the display shown the user.

According to another aspect, a system for displaying advertising content in a user interface of an application is provided. The system comprises: at least one processor configured to: access data associated with a user who is interacting with the user interface of the application via a client device; determine an indication of a likelihood that the user will complete a target action based on the data associated with the user; determine whether to display the advertising content in the user interface of the application based on the indication of the likelihood that the user will complete the target action; and in response to determining to display the advertising content to the user, trigger displaying of the advertising content in a portion of the user interface of the application.

According to one embodiment, the data associated with the user comprises client activity signals based on real time interactions of the user with the user interface of the application. According to one embodiment, the client activity signals are based on real time interactions of the user with the user interface of the application while searching for one or more products or services for purchase. According to one embodiment, the data associated with the user comprises data indicating past activity of the user.

According to one embodiment, the data indicating past activity of the user comprises data indicating at least one of: a source from which the user navigated to the user interface of the application, a method by which the user navigated to the user interface of the application, or one or more instances in which the target action was previously performed by the user. According to one embodiment, the indication of the method by which the user navigated to the user interface of the application comprises an indication of at least one of: selection of a bookmark, selecting a result from a search performed on a search site, typing in a URL, selection of an ad for the user interface of the application, or access from an email. According to one embodiment, the indication of the source from which the user navigated to the user interface of the application comprises an indication of at least one of: a category of a website from which the user navigated to the user interface of the application, and a website separate from a website of the application.

According to one embodiment, the at least one processor is configured to: identify a context of the user in the user interface of the application; and determine the indication of the likelihood that the user will complete the target action based on the identified context. According to one embodiment, the at least one processor is configured to determine, based on the context, an intent of the user to purchase a product or service.

According to one embodiment, triggering displaying of the advertising content comprises triggering generation of an interactive user interface, the interactive user interface displaying the advertising content and allowing the user to locate a product or service from a plurality of content providers. According to one embodiment, the interactive user interface comprises a new web page. According to one embodiment, the at least one processor is configured to trigger: performing of a search for the product or service and/or the at least one related product or service; and displaying of search results from the plurality of content providers in the interactive user interface.

According to one embodiment, the at least one processor is configured to determine, based on the context, an intent of the user to purchase a product or service, and wherein the system further determines whether to display the advertising content in the user interface responsive to: a type of the product or service, a relative value of the product or service, availability of the product or service, a price of the product or service, or a profit margin associated with the product or service.

According to one embodiment, the target action comprises a transaction to purchase a product or service. According to one embodiment, the target action comprises clicking on at least one paid placement associated with a provider of a product or service. According to one embodiment, the target action comprises submitting user contact information within the interface.

According to one embodiment, the at least one processor is configured to: determine a user score based on the indication of the likelihood that the user will complete the target action; and determine whether to display the advertising content to the user based on the user score. According to one embodiment, the at least one processor is configured to: segment the user into a first one of a plurality of categories when user score has a first value; segment the user into a second one of the plurality of categories when the user score has a second value; determine to display the advertising content to the user in response to segmenting the user into the first category; and determine to not display the advertising content to the user in response to segmenting the user into the second category. According to one embodiment, the at least one processor is configured to: determine whether to display the advertising content to the user by comparing the user score to a reference value; and trigger displaying of the advertising content as part of the user interface of the application based on a result of comparing the user score to the reference value.

According to one embodiment, the at least one processor is configured to: in response to determining to not display the advertising content to the user, trigger reduction of visibility of the advertising content to the user. According to one embodiment, the at least one processor is configured to modify the advertising content based on the indication of the likelihood that the user will complete the target action. According to one embodiment, the at least one processor is configured to: provide at least a portion of the data related to the user as input to a model to obtain a corresponding output; and determine the indication of the likelihood that the user will complete the target action based on the output.

According to one embodiment, the at least one processor is configured to determine whether to display the advertising content in the user interface responsive to: determining a user status; and determining the indication of the likelihood that the user will complete the target action based the user status. According to one embodiment, the at least one processor is configured to compare the user status to a set of predetermined criteria and responsive to the comparison, determine whether to display the advertising content in the user interface.

According to one embodiment, the at least one processor is configured to determine whether to display the advertising content in the user interface responsive to: whether the user has previously completed the target action, whether the user has previously visited the user interface of the application, whether the user is logged in to the application, whether the user is a registered user of the application, whether the user is a member of loyalty program associated with the application an indication of a location of the user, or an indication of a current time of the user.

According to one embodiment, the at least one processor is configured to determine whether to display the advertising content in the user interface responsive to: at least one search previously performed by the user, at least one previous purchase performed by the user, browsing activity of the user, progress that the user has made towards a checkout step, presence of one or more items in a shopping cart of the user, a URL associated with the user interface, or a duration of time that the user has interacted with the user interface of the application.

According to one embodiment, the at least one processor is configured to determine whether to display the advertising content in the user interface of the application based on an indication of at least one of: a profit that the user is expected to generate associated with completion of the target action, expected revenue associated with completion of the target action, an expected loss in profit or revenue for the target action if the advertising content is displayed to the user, an expected contribution per visitor (CPV) of the user, a likelihood that the user is expected to subsequently return to the user interface of the application, a likelihood that the user will leave the user interface of the application, or a lifetime value of the user.

According to one embodiment, the at least one processor is configured to update the indication of the likelihood that the user will complete the target action in real time responsive to new data associated with the user as the user interacts with the application. According to one embodiment, the at least one processor is configured to determine whether to display the advertising content based on whether one or more advertisers are willing to pay above a threshold amount for display of the advertising content. According to one embodiment, the indication of the likelihood that the user will complete the target action comprises an indication of a likelihood that the user will complete at least one action correlated or anti-correlated with the target action.

According to one embodiment, the user interface of the application comprises a web page. According to one embodiment, the system further comprises a network interface, and wherein the at least one processor is configured to: receive at least some of the data related to the user via the network interface in response to execution of program code included in the application.

According to another aspect, a computer-implemented method of displaying advertising content in a user interface of an application is provided. The method comprises: accessing, by at least one processor, data associated with a user who is interacting with the user interface of the application via a client device; determining, by the at least one processor, an indication of a likelihood that the user will complete a target action based on the data associated with the user; determining, by the at least one processor, whether to display the advertising content in the user interface of the application based on the indication of the likelihood that the user will complete the target action; and in response to determining to display the advertising content to the user, triggering, by the at least one processor, displaying of the advertising content in a portion of the user interface of the application.

According to one embodiment, the act of accessing the data associated with the user comprises accessing client activity signals based on real time interactions of the user with the user interface of the application. According to one embodiment, the act of accessing the client activity signals comprises accessing the client activity signals based on real time interactions of the user with the user interface of the application while searching for one or more products or services for purchase.

According to one embodiment, the act of accessing the data associated with the user comprises accessing data indicating past activity of the user. According to one embodiment, the act of accessing the data indicating past activity of the user comprises accessing data indicating at least one of: a source from which the user navigated to the user interface of the application, a method by which the user navigated to the user interface of the application, or one or more instances in which the target action was previously performed by the user. According to one embodiment, the act of accessing data indicating the method by which the user navigated to the user interface of the application comprises accessing data indicating at least one of: selection of a bookmark, selecting a result from a search performed on a search site, typing in a URL, selection of an ad for the user interface of the application, or access from an email. According to one embodiment, the act of accessing data indicating the source from which the user navigated to the user interface of the application comprises accessing data indicating at least one of: a category of a website from which the user navigated to the user interface of the application, and a website separate from a website of the application.

According to one embodiment, the method further comprises: identifying a context of the user in the user interface of the application; and determining the indication of the likelihood that the user will complete the target action based on the identified context. According to one embodiment, the method further comprises determining, based on the context, an intent of the user to purchase a product or service.

According to one embodiment, the act of triggering displaying of the advertising content comprises triggering generation of an interactive user interface, the interactive user interface displaying the advertising content and allowing the user to locate a product or service from a plurality of content providers. According to one embodiment, the act of triggering displaying of the interactive user interface comprises triggering displaying of the interactive user interface in a new web page. According to one embodiment, the method further comprises triggering: performing of a search for the product or service and/or the at least one related product or service; and displaying of search results from the plurality of content providers in the interactive user interface.

According to one embodiment, the method further comprises determining an intent of the user to purchase a product or service; and determining whether to display the advertising content in the user interface responsive to: a type of the product or service, a relative value of the product or service, availability of the product or service, a price of the product or service, or a profit margin associated with the product or service.

According to one embodiment, the target action comprises a transaction to purchase a product or service. According to one embodiment, the target action comprises clicking on at least one paid placement associated with a provider of a product or service. According to one embodiment, the target action comprises submitting user contact information within the interface.

According to one embodiment, the method further comprises: determining a user score based on the indication of the likelihood that the user will complete the target action; and determining whether to display the advertising content to the user based on the user score. According to one embodiment, the method further comprises: segmenting the user into a first one of a plurality of categories when user score has a first value; segmenting the user into a second one of the plurality of categories when the user score has a second value; determining to display the advertising content to the user in response to segmenting the user into the first category; and determining to not display the advertising content to the user in response to segmenting the user into the second category. According to one embodiment, the method further comprises determining whether to display the advertising content to the user by comparing the user score to a reference value; and triggering displaying of the advertising content as part of the user interface of the application based on a result of comparing the user score to the reference value.

According to one embodiment, the method further comprises in response to determining to not display the advertising content to the user, triggering reduction of visibility of the advertising content to the user. According to one embodiment, the method further comprises modifying the advertising content based on the indication of the likelihood that the user will complete the target action. According to one embodiment, the method further comprises providing at least a portion of the data related to the user as input to a model to obtain a corresponding output; and determining the indication of the likelihood that the user will complete the target action based on the output.

According to one embodiment, the method further comprises determining whether to display the advertising content in the user interface responsive to: determining a user status; and determining the indication of the likelihood that the user will complete the target action based the user status. According to one embodiment, the method further comprises comparing the user status to a set of predetermined criteria; and responsive to the comparison, determining whether to display the advertising content in the user interface.

According to one embodiment, the method further comprises determining whether to display the advertising content in the user interface responsive to: whether the user has previously completed the target action, whether the user has previously visited the user interface of the application, whether the user is logged in to the application, whether the user is a registered user of the application, whether the user is a member of loyalty program associated with the application an indication of a location of the user, or an indication of a current time of the user.

According to one embodiment, the method further comprises determining whether to display the advertising content in the user interface responsive to: at least one search previously performed by the user, at least one previous purchase performed by the user, browsing activity of the user, progress that the user has made towards a checkout step, presence of one or more items in a shopping cart of the user, a URL associated with the user interface, or a duration of time that the user has interacted with the user interface of the application.

According to one embodiment, the method further comprises determining whether to display the advertising content in the user interface of the application based on an indication of at least one of: a profit that the user is expected to generate associated with completion of the target action, expected revenue associated with completion of the target action, an expected loss in profit or revenue for the target action if the advertising content is displayed to the user, an expected contribution per visitor (CPV) of the user, a likelihood that the user is expected to subsequently return to the user interface of the application, a likelihood that the user will leave the user interface of the application, or a lifetime value of the user.

According to one embodiment, the method further comprises updating the indication of the likelihood that the user will complete the target action in real time responsive to accessing new data associated with the user as the user interacts with the application. According to one embodiment, the method further comprises determining whether to display the advertising content based on whether one or more advertisers are willing to pay above a threshold amount for display of the advertising content. According to one embodiment, the act of determining the indication of the likelihood that the user will complete the target action comprises determining an indication of a likelihood that the user will complete at least one action correlated or anti-correlated with the target action.

According to one embodiment, the user interface of the application comprises a web page. According to one embodiment, the method further comprises receiving at least some of the data associated with the user in response to execution of program code included in the application.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
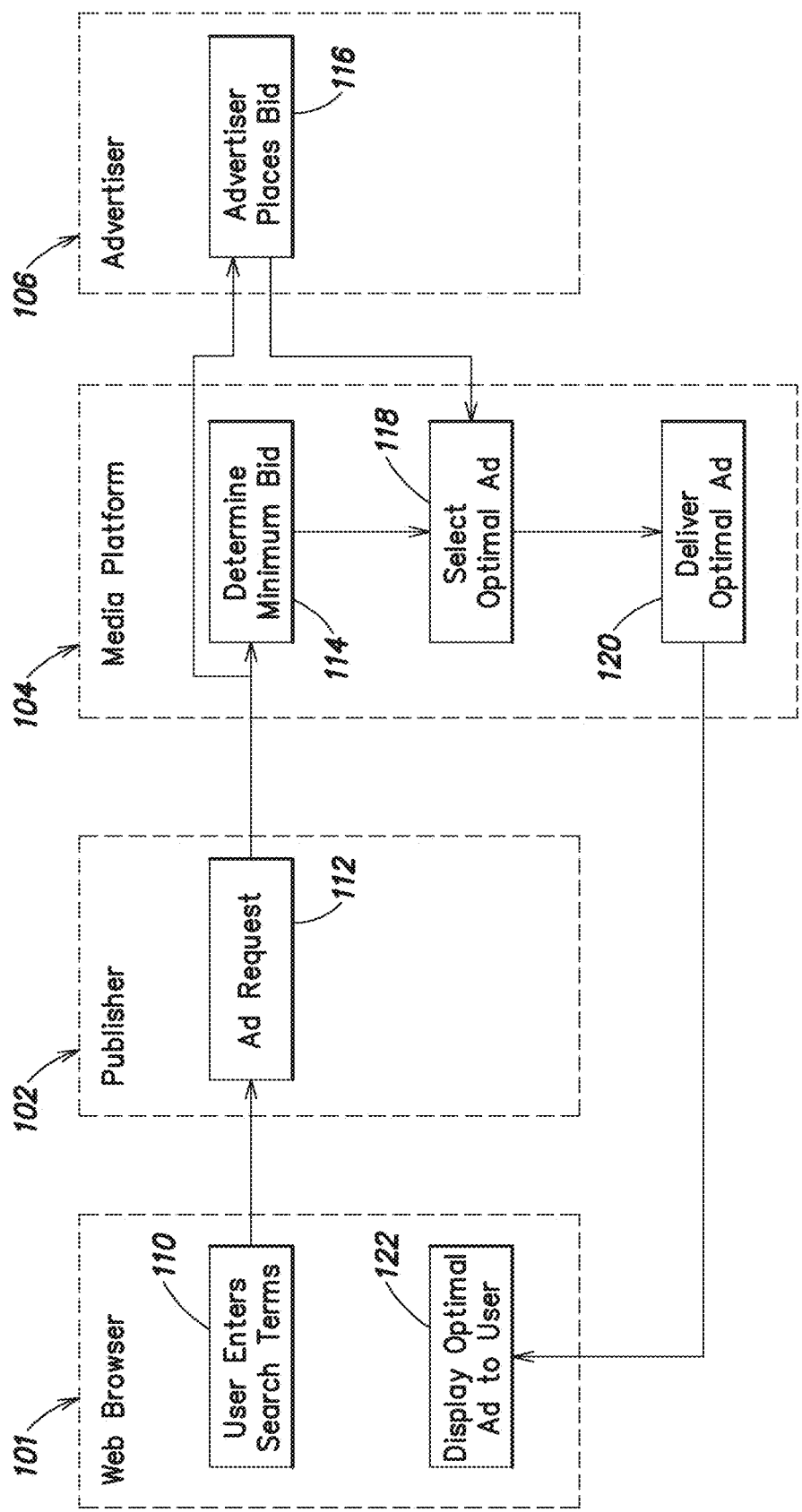
FIG. 1 is a schematic diagram of an exemplary system in accordance with one embodiment of the present disclosure.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

System Overview

According to one aspect of the present invention, a system and method is provided to permit one or more advertisers to display one or more advertisements on, for example, an e-commerce website that is controlled by a publisher other than any of the advertisers. As discussed above, it may be desirable for publishers and/or advertisers to display the advertisement based on the intent of a user (also referred to as a visitor) interacting with the e-commerce website. For example, where the intent of the user is to purchase an airline ticket, an advertisement that targets this intent (such as an advertisement for a particular airline) may be displayed to the user. Accordingly, in one embodiment, it is possible for advertisers to quickly and easily identify, for example, which product, products, or class of products a user is searching for or intending to purchase, and to display advertisements targeting the user on the basis of that knowledge. It should be understood that in some embodiments a publisher may also be an advertiser, for example, a publisher that advertises on an e-commerce website operated by the publisher.

It may further be desirable for the publisher to optimize (or maximize) a contribution per visitor (CPV) by, for example, providing an auction where advertisers enter bids for advertising space on the e-commerce website. In one example, a hurdle rate is determined based at least on the calculated value of expected revenue derived from the user where no ad is displayed on the e-commerce website. Where one or more advertiser bids match or exceed the minimum bid, advertisements associated with the bids may be displayed to the user visiting the e-commerce website. In another example, the hurdle rate may be determined based on a characteristic of the user, such as whether the visitor is a high value visitor or a low value visitor. To these ends, a system and method may be provided for displaying advertisements based on user intent in an auction-based environment.

Another aspect of the present invention relates to a process for monetizing the purchase intent of users across multiple e-commerce sites. According to various aspects of the present invention, a distributed server-based system may serve advertisements to a number of e-commerce websites based on user intent as determined by or from one or more client systems. In one example, the client system may be a browser-based system that permits the user to interact with e-commerce sites. However, it should be appreciated that any type or combination of clients may be used (e.g., thick or thin clients; different types of client systems, such as cell phones, PDAs, web servers, etc.; and different types of programs, such as OSs, application programs, etc.). These other types of clients, programs and/or systems may provide such intent information in real-time.

According to one embodiment, one or more components may be provided that determine the intent of a user viewing an e-commerce website and identify one or more advertisements that target the intent. For instance, a component that resides on an e-commerce site may track user activity and/or context and select advertisements that match that activity and/or context.

According to another embodiment, there may be a threshold advertising rate that is used to determine whether or not particular ads are displayed, which is similar to a reserve price in an auction. For instance, a "hurdle rate" may be calculated that defines a cost threshold that an advertiser would need to pay in order to display their ads on another e-commerce website. In one example, the hurdle rate may relate to the amount of expected profit that could be realized by displaying a particular ad on an e-commerce website tempered by the realization (or conversion) rate typically experienced by the website. In another example, the hurdle rate may also relate to the expected transaction net revenue in, for example, a particular process context. Further, the hurdle rate may also relate to the return-to-purchase rate, which is a measure of how often a visitor returns to the e-commerce website to make a purchase after having left to visit another website prior to the purchase (e.g., a visitor who may be "shopping around"). Depending on the product being offered on the e-commerce site, the hurdle rate, and the conversion rate, a decision engine may determine whether or not an ad is displayed to the user at a particular context within the e-commerce site.

The one or more components that perform these functions may be executed on one or more general purpose computer systems. For instance, one or more of these components may execute as processes on a server, a client, or both in association with an e-commerce site.

FIG. 1 illustrates a schematic overview of an exemplary system according to an embodiment of the disclosure. Shown is an interface of a client computer 101, such as a web browser, a publisher 102 of an e-commerce website, a media platform 104, and an advertiser 106. Media platform 104 may be a computer server or a distributed computer system on which various embodiments of the present disclosure may be implemented, including, but not limited to, determining an intent of a visitor to an e-commerce website, determining a hurdle rate, selecting an optimal advertisement, and displaying the optimal advertisement to the visitor. There may be more than one interface 101, publisher 102, and advertiser 106. Publisher 102 provides one or more web pages (not shown) to a user through interface 101. The user interacts with the e-commerce website through the user interface to identify, locate, and/or purchase a product, for example, airline tickets or other item, by providing search terms 110. Other information may also, or alternatively, collected from the user by publisher 102. This information may be used to determine an intent of the user, such as an intent to purchase airline tickets on a specific day, or to a specific city, or other similar travel-related details. It should be understood that the present disclosure is not limited to travel products, but may include any products sold or advertised through electronic commerce.

After the user enters search terms 110 (or other information), publisher 102 sends an advertisement request 112 to media platform 104. Media platform 104 uses the ad request to, among other activities, determine a hurdle rate 114 for serving an advertisement to the publisher. In one embodiment, the hurdle rate is a minimum bid that must be received from an advertiser in order to serve the ad. It should be understood that the hurdle rate may include the minimum bid as well as other factors, such as a minimum net transaction revenue or minimum media revenue, among others. In one example, the minimum bid may be based on a reserve price of an auction, where the auction is for the opportunity to display one or more selected advertisements to a website visitor. The minimum bid may reflect the monetized value of an identified intent of the visitor to, for example, purchase a product. Further, the hurdle rate may represent a combination of bids from multiple advertisers, such as in a multi-ad unit, which is described below. For example, a multi-ad unit may not be served to a publisher unless the combination of all bids for each ad in the multi-ad unit exceeds the hurdle rate.

The minimum bid may be determined in real-time and may be determined from information included in the ad request. Advertiser 106 may also receive information regarding the intent from publisher 102 through media platform 104, and may place an advertising bid 116 based on the intent (or other information included in the ad request) if, for example, the advertiser desires to advertise to the user.

Next, media platform 104 selects an optimal ad 118 based at least on the intent and the bid (or bids, if multiple bids have been placed). The optimal ad may be selected from a database containing multiple ads, such as ads within an advertising campaign. The optimal ad may also contain dynamically-created creative content, such as text or hyperlinks, which target the intent of the user. In one example, the optimal ad is the ad having the highest bid that exceeds the minimum bid. According to one embodiment, if no ad has a bid that meets or exceeds the minimum bid, no ad will be served. Notably, the minimum bid may serve as a threshold that should be exceeded to prevent the cannibalization of transaction revenue that may occur if advertisements are displayed to the user. In another example, the optimal ad is the ad having the highest calculated advertisement revenue potential, which is also referred to as media revenue. Other exemplary ways of selecting an optimal ad are possible, including but not limited to selecting an ad offering a combination of highest bid and highest revenue potential.

The optimal ad, if any, is then delivered 120 to interface 101 and displayed to the user 122 within, for example, a web page produced by publisher 102. According to another embodiment, more than one optimal ad may be selected and displayed on the e-commerce website. An outcome resulting from serving or not serving the optimal ad may be stored and used for future optimization of ad selection.

Figure 2:
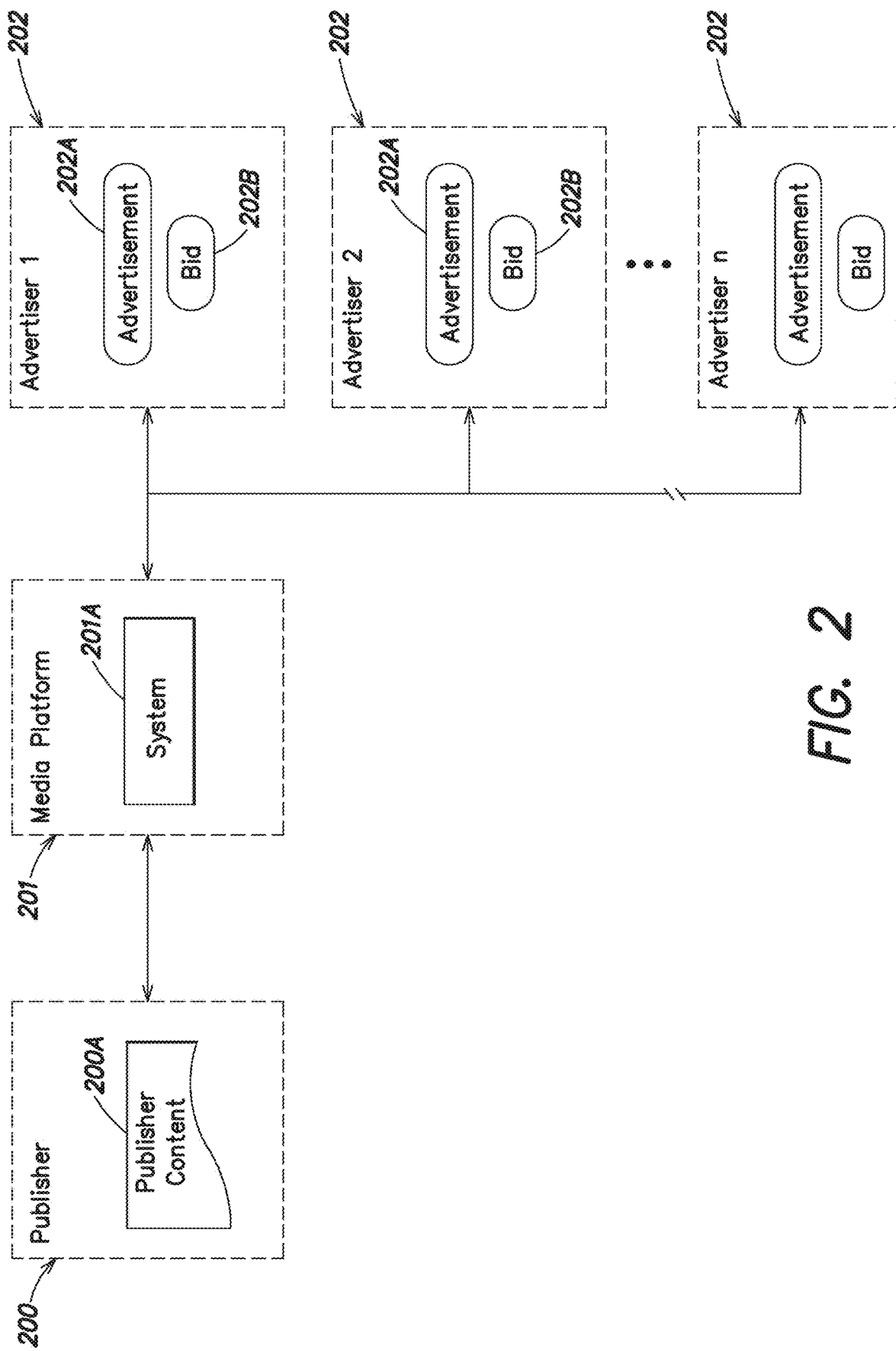
FIG. 2 is an exemplary system diagram in accordance with one embodiment of the present disclosure.

FIG. 2 illustrates various interactions of an exemplary system according to various embodiments of the disclosure. As shown, a publisher 200 provides publisher content 200A, for example, one or more web pages each having one or more advertisements, which may be viewed within a web browser operating on a client computer of a user (not shown). A media platform 201 includes a system 201A for delivering advertising in an online environment. System 201A includes, but is not limited to, an online auction for providing access to publisher 200 from one or more advertisers 202. System 201A may also include one or more components adapted to identify and serve ads to publisher 200 to be displayed to a visitor viewing the web pages. Advertisers 202 provide one or more advertisements 202A and bids 202B to system 201A.

In one embodiment, system 201A determines and serves, based on bids 202B, threshold criteria provided by advertiser 202, and user-generated information from publisher 200, an optimal advertisement 202A to be displayed by publisher 200 within publisher content 200A.

In another embodiment, system 201A determines an intent of a user interacting with publisher content 200A and serves, based on information provided by advertiser 202 and other information provided by publisher 200, an advertisement 202A related to the intent to be displayed by publisher 200 within publisher content 200A.

Exemplary System Architecture

Figure 3:
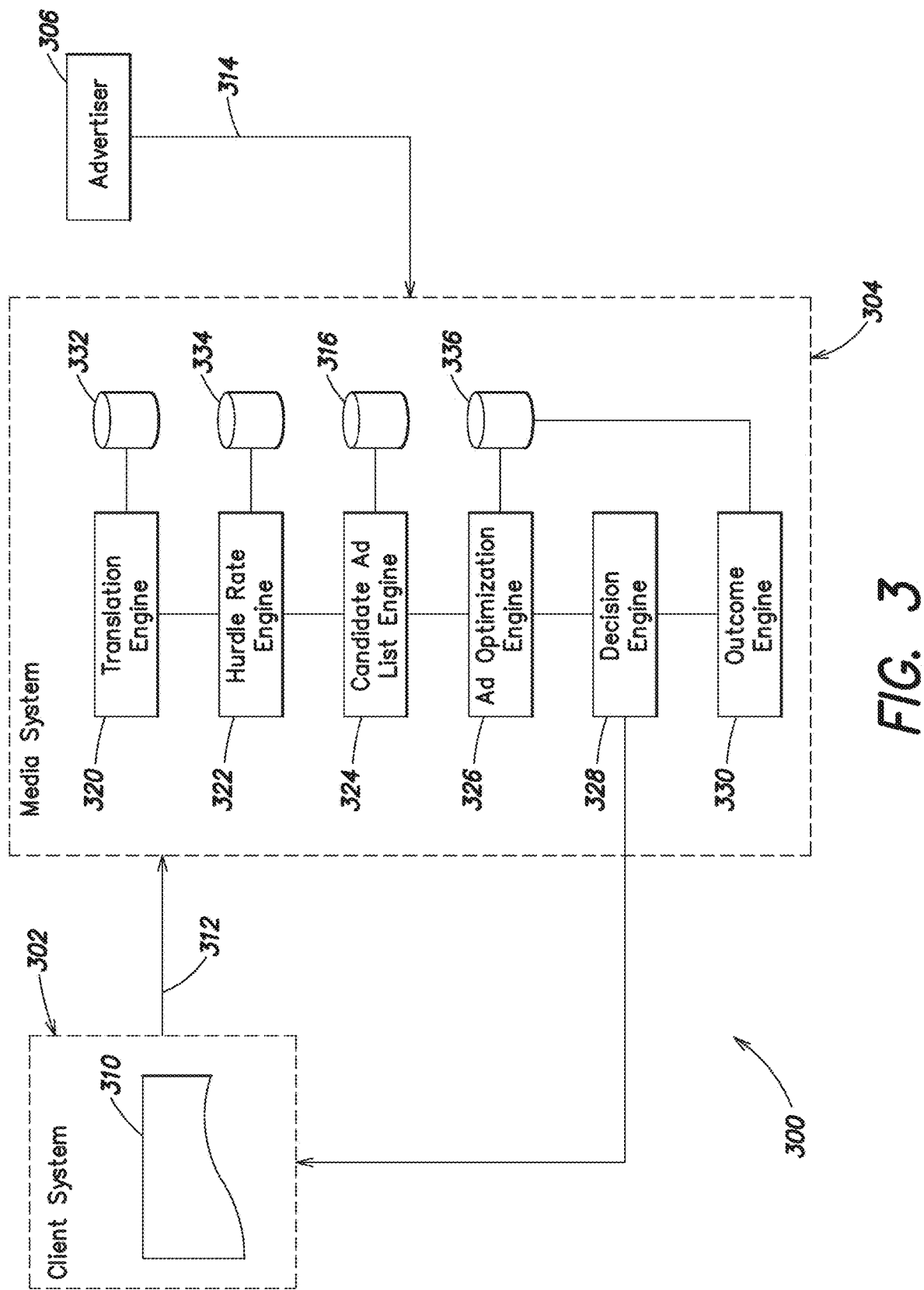
FIG. 3 is an exemplary system architecture diagram in accordance with one embodiment of the present disclosure.

FIG. 3 shows an architecture diagram of an example system 300 according to one embodiment of the invention. System 300 may, for instance, be one implementation of the system discussed above with reference to FIG. 2. It should be appreciated that FIG. 3 is used for illustration purposes only, and that other architectures may also be used to facilitate one or more aspects of the present invention.

As shown in FIG. 3, a distributed system 300 may be used to display one or more advertisements to a user within an e-commerce site. According to one embodiment, system 300 may include one or more components that operate in cooperation with the e-commerce site. The components may include one or more client systems 302 and a media system 304. For example, these components may execute on one or more computer systems associated with or interconnected to an e-commerce provider. System 300 may include one or more processes that respond to requests from one or more client programs, such as a web browser or agent-facing system (GDS). Process may include, for example, an HTTP server or other server-based process (e.g., a database server process, XML server, peer-to-peer process) that interfaces to one or more client programs distributed among one or more client systems. One or more advertisers 306 may interact with media system 304.

According to one embodiment, one or more client systems 302 may be capable of displaying advertisements to users. The client systems 302 may include, for example, any type of operating system and/or application program capable of communicating with other computer systems through a communication network, such as the Internet. In one particular instance, the client system 302 may include a browser application program that communicates with one or more server processes using one or more communication protocols (e.g., HTTP over a TCP/IP-based network, XML requests using HTTP through an Ajax client process, distributed objects, etc.).

The client system 302 may include one or more interfaces 310 through which advertisements may be presented to the user. In one example, advertisements may be presented in an interface of a browser program executing on a client computer system. As discussed above, one aspect of the present invention relates to determining a user's context and/or intent within an e-commerce site and using such intent and/or context to determine ads displayed to a user. Such ads may be displayed, for example, in an interface associated with an e-commerce site within an interface of the browser program.

According to another embodiment, the media system 304 receives one or more ad requests 312 from a publisher through the client system 302, and one or more advertiser inputs 314 from one or more advertisers 306. The media system 304 receives one or more advertisements and/or advertising campaigns from the advertiser 306, which are stored in an advertising campaign database 316. The media system 304 serves advertisements to the publisher, which in turn displays the advertisement to a user through, for example, interface 310. The media system 304 includes the following components: a translation engine 320, a hurdle rate engine 322, a candidate list engine 324, an ad optimization engine 326, a decision engine 328, and an outcome engine 330. The media system also includes, in addition to the advertising campaign database 316, a translation database 332, a hurdle rate database 334, and an optimization database 336.

As will be described in greater detail below, the translation engine 320 translates the ad request 312 into one or more normalized values, such as visitor intent or visitor process context. The candidate list engine 324 generates, from the advertising campaign database 316, a list of candidate ads. A list of candidate ads may include one or more ads that, for example, target the intent of the visitor and/or target the visitor interacting with an e-commerce website within a particular process context. For example, in an ad campaign for travel to multiple Caribbean destinations, the list of candidate ads may contain ads, drawn from many ads in the campaign, for air travel to San Juan, P.R. if the visitor expresses an intent to fly to Puerto Rico. In a further example, the list of candidate ads may contain ads directed to hotels in San Juan if the visitor has purchased airline tickets to San Juan.

The hurdle rate engine 322 calculates a hurdle rate based at least on the ad request, which may include information used to determine visitor intent, a request for one or more specific ad unit types, and other information. The optimization engine 326 selects one or more optimal ads from the list of candidate ads having the highest potential media revenue and/or the highest associated bids. The decision engine 328 selects any number of the optimal ads (including no optimal ads) and, if any, serves them to the publisher for display to the visitor. Finally, the outcome engine 330 stores the outcome for future use. The outcome may include, for example, the list of optimal ads and other data associated with the media system 304.

Exemplary Method

Figure 4:
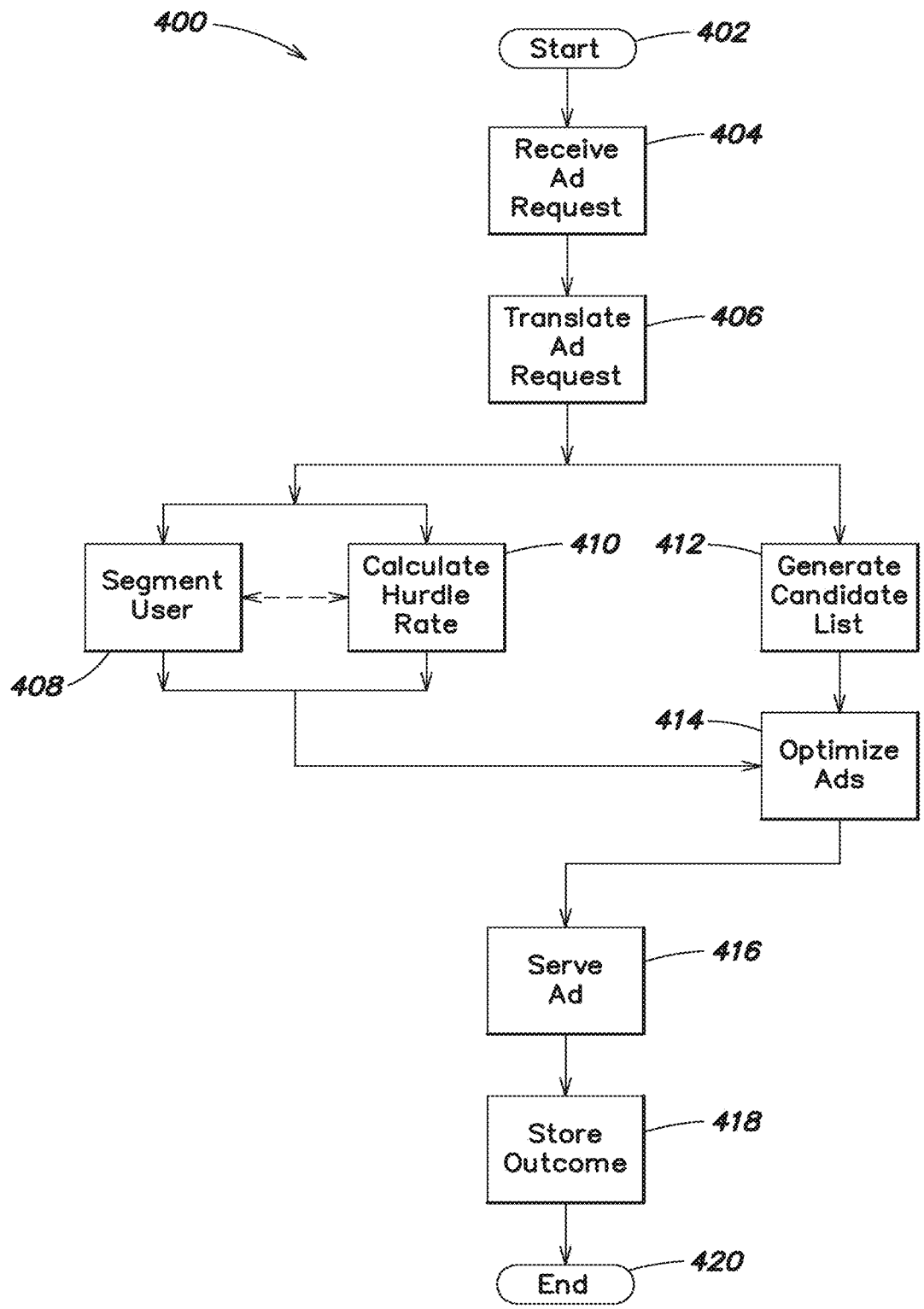
FIG. 4 illustrates an exemplary process for delivering advertising in accordance with one embodiment of the present disclosure.

Shown in FIG. 4 is one embodiment of a process for delivering advertising 400. Process 400 may, for instance, be one implementation of system 300 as discussed above with reference to FIG. 3. Process 400 begins at start block 402. At block 404 an ad request is received from a publisher of an e-commerce website. The ad request may be received as a result of user (also referred to as visitor) interaction with an e-commerce website. For example, a user performing a search at the website may express an intent with respect to one or more products. Information based on the intent may be used by the publisher to generate an ad request, which is sent to a media system, such as media system 304 referenced above with respect to FIG. 3. For example, a user searching for hotels in San Francisco may express an intention to visit San Francisco. This information may be included in the ad request, such as in a request for San Francisco hotel ads. The ad request may also include other information, such as a type of media ad unit requested by the publisher.

At block 406 an ad request is translated by the media system. The ad request may be translated into one or more intent targets and/or one or more process contexts (also referred to as intent stages). Translation may be performed, for example, by a translation engine 320 as discussed above with reference to FIG. 3. For example, because information included within the ad request may not be standardized, the ad request may be translated into a normalized set of values that facilitate an advertisement bidding and selection process that is standardized across multiple systems, advertising campaigns, and other cross-platform or cross-market activities.

At block 408, users may optionally be segmented into two or more groups. For example, one user may be designated as a "high value visitor," and another user may be designated a "low value visitor" based on a number of factors including, but not limited to, whether the user is a past purchaser, a loyalty program member, or other factors that identify the value of the user to the publisher and/or advertiser. Other categories or classifications may be used to segment users. As described herein, according to one embodiment, user segmentation may be used to determine whether an ad is displayed to the user; however, segmentation is not limited to such use.

At block 410, a hurdle rate may be optionally calculated based at least on the intent targets and/or process contexts of the user. According to one embodiment, the hurdle rate may be calculated by a hurdle rate engine 322 as discussed above with reference to FIG. 3. In one embodiment, only user segmentation is performed. In another embodiment, only hurdle rate calculation is performed. In yet another embodiment, both user segmentation and hurdle rate calculation are performed.

At block 412, a list of candidate advertisements may be generated from a plurality of advertisements, such as advertisements within an ad campaign. The list of candidate advertisements may be generated by, for example, a candidate ad list engine 324 as discussed above with reference to FIG. 3. In one embodiment, the list of candidate ads may be generated based on the intent targets and/or process contexts.

At block 414, a list of candidate advertisements may be optimized. In one embodiment, one or more ads from the list of candidate ads having the highest potential media revenue are selected by, for example, an ad optimization engine 326 as discussed above with reference to FIG. 3. In another embodiment, one or more ads from the list of candidate ads having a bid greater than the hurdle rate are selected. Determination of which candidate ads are selected may be based on specific or pre-selected user intents, or on other criteria set by publishers and/or advertisers. For example, an advertiser may choose to only bid on ads targeting a specific intent, for example, an intent to travel to California by rail. In another example, a publisher may choose to request ads that only target a specific intent.

At block 416, the selected ads are served to the publisher to be displayed to the user. At block 418, an outcome of serving the ad is stored. The outcome, for example, may include information about whether the ad was "clicked" on by the user, or whether the user completed a transaction on the website after the ad was displayed to the user. For instance, some users having similar intents (e.g., users expressing an intention to fly to San Juan) may be shown an ad, and other users having substantially the same intents may not be shown any ad. The outcomes relative to all users may be identified and stored for future use, such as determining whether displaying the ad to the user created a negative CPV, or a loss of net revenue or media revenue for the publisher. Such a loss of revenue may be caused, for example, by calculating a hurdle rate that is too low, or by not properly segmenting users, or both. Other factors may also contribute to a loss of revenue, such as certain configurations of ad formats, ad uses, ad campaigns, and/or media unit types.

At block 420, process 400 ends.

Visitor Intent

According to one aspect of the present disclosure, an intent of a visitor to an e-commerce website can be determined based on the interaction of the user with the website. In one non-limiting example, a visitor searching for flights to Aruba is expressing an intention to travel to Aruba, which may be useful to an advertiser not only for directed advertising of flights to Aruba, but for also advertising other products related to the intent, such as hotels, restaurants, rental cars, or other travel-related products. An intent of a visitor to an e-commerce website may represent a significant information asset held by the publisher of the website, which may be monetized using various embodiments of systems and methods disclosed herein.

In one embodiment of the disclosure, intent can be determined from the type of website being visited, such as a travel planning website. However, this alone may not adequately describe the intent of the visitor because, for example, the fact that the visitor is at a travel website does not describe where, when, and how the visitor wishes to travel. To determine more information, intent can be determined based on keywords or search terms supplied by the user, from behaviors of the user as the user interacts with the website, such as selecting certain product descriptions and reviews, and/or from characteristics of the user, such as a location of the user (e.g., New York, N.Y.) or a loyalty program status of the user (e.g., the American Airlines AAdvantage Gold® loyalty program).

A publisher of an e-commerce website may realize transaction (or sales) revenue generated by a visitor when the visitor purchases a product through the website. The publisher may further (or alternately) realize media (or advertising) revenue when advertisements are displayed on web pages viewed by the visitor. It is appreciated that advertising targeted to the intent of the user may yield greater media revenue than non-targeted advertising. Further, media revenue may further increase in proportion to a degree of targeting, for example, advertising targeted to a particular product within a class of products may yield higher revenue than advertising targeted to the class of products. For example, ads for a class of products may include "flights to Honolulu," and ads for a particular product within the class may include "flights from Sacramento to Honolulu." Accordingly, an intent of the visitor may be used to identify targeted ads of varying degrees which each represent a known or expected level of revenue potential for the publisher.

Granularity of Intent

In another aspect, it is appreciated that by resolving an intent of a visitor to an e-commerce website into more granular specific intents, and allowing advertisers to bid on ads targeting the specific intents, the value of the ads in an auction-based market more accurately reflects their true market value. Commonly, for example, advertisers place bundled bids for a particular intent target, such as hotel rooms. In a bundled bid, the same bid value is given to the hotel room ads regardless of how many nights the rooms are reserved for. Thus, the value of an ad for a hotel room is the same for a one-night stay as it is for a five-night stay. However, such bundled bids do not account for the actual variation in values between ads targeting one-night stays and ads targeting five-night stays. For example, an airport hotel, which largely caters to business travelers, accommodates guests for one-night stays more frequently than five-night stays. Accordingly, ads targeting travelers who intend to stay at an airport hotel for one night may have a higher value than ads targeting travelers who stay for five nights.

According to an embodiment, it is appreciated that bundled bids may restrict entrants into an advertising market because such bids do not account for differences in the value of a specific intent to each advertiser. For example, the value of an ad targeting a one-night stay at an airport hotel may be greater than the value of an ad targeting a one-night stay at a destination resort hotel (because fewer one-night stays occur at a destination resort and therefore such ads are of lesser value to the advertiser). Therefore, according to one embodiment, advertisers may bid on the opportunity to serve ads targeting a specific intent of an e-commerce website visitor. For example, advertisers may place separate bids for ads targeting a one-night hotel stay, two-night stay, etc., based on characteristics of the hotel property (e.g., airport, neighborhood, city, leisure/resort). By enabling advertisers to bid on more granular degrees of specific intent, the advertising market for advertisers may become more diverse and the value of the specific intent may more accurately reflect the true market value of advertising that is directed to the specific intent than advertising targeting a more general intent (e.g., bundled bids). Accordingly, different advertisers, each targeting a different specific intent, may be incentivized to bid for advertising a product (e.g., hotel rooms). The highest bid for each specific intent (e.g., one roomnight) within the general intent (e.g., hotels), may therefore be placed by different advertisers.

Intent Stage

According to one aspect of the disclosure, an intent of a visitor may be associated with an intent stage (or process context). The intent stage may be used to identify a position of the visitor in the "shopping-purchase-consumption" process. Further, the intent stage may be used to associate the position (or context) of the visitor with one or more relevant advertisements. For example, a visitor beginning a search for a product may have an intent stage of "shopping." A visitor who is "shopping" may continue to shop, or may discontinue shopping without making a purchase (e.g., "bailing-out"). During the shopping stage, the visitor may be searching for a product, viewing a list of products, viewing details of one or more selected products, or placing one or more selected products into a "shopping cart" for purchase. Each of these activities may be used to provide additional information about the visitor.

An example of an ad relevant to "shopping" is an ad served on any page viewable during the shopping process or within an "alert e-mail." An example of an ad relevant to "bailing-out" is an ad served within a "pop-under" window, which is displayed to the visitor after leaving the website. In another example, a visitor who has completed a purchase transaction may have an intent stage of "post-purchase" or "consumption." An example of an ad relevant to "post-purchase" or "consumption" is an ad on a purchase confirmation web page, or an ad on a post-purchase confirmation or follow-up e-mail.

In one embodiment, an intent stage may be used to determine an optimal advertisement to be displayed to a visitor. As discussed below, the intent stage may alter the hurdle rate or minimum bid price for an ad. For example, a hurdle rate may be lower for a visitor who has completed a purchase relative to a visitor who is still shopping because, after a transaction, the publisher has acquired transaction revenue and thus the CPV could only increase by also receiving media revenue. In another example, a hurdle rate may increase as a visitor achieves a deeper intent stage (e.g., an ad on a second page of the website may be more valuable to the advertiser than an ad on a first page of the website because the intent of the visitor may be more specifically determined as the visitor continues to interact with the website).

Media Unit Types

According to an aspect, various embodiments of systems and methods disclosed herein will accommodate a variety of advertising types. A media unit type, as used herein, refers to a form of advertising for monetizing intent. In one embodiment, the media unit type is a standard ad unit. A standard ad unit includes an Interactive Advertising Bureau (IAB) standard ad slot on a web page provided by a publisher where the creative content of the ad is provided by the advertiser.

In another embodiment, a media unit type is an integrated ad unit. An integrated ad unit is a non-IAB standard ad slot on a web page provided by a publisher where the ad contains publisher-specific style, form, and/or content.

In still another embodiment, a media unit type is a comparison shopping widget. A comparison shopping widget is an interface that allows a visitor to perform a single search that matches the intent of the user across multiple retailers or merchants. For example, a box is displayed containing multiple retailer names and check boxes next to each name. If the visitor selects any check box, the search will be performed for each of the selected retailers, and the results are then returned to the visitor. The results may be displayed to the visitor on the same or a different webpage.

In yet another embodiment, a media unit type is an e-mail containing an ad.

Click Models

According to an aspect, various embodiments of systems and methods disclosed herein accommodate a variety of "landing page" models. A landing page is a web page that is displayed when a user clicks on an ad. For example, if a user clicks on an ad for flat screen TVs, the user may be presented with a new web page listing flat screen TVs for sale. A "click-out" ad is an advertisement that links the user to a landing page specified by the advertiser (e.g., a web page on the advertiser's website).

A "click-in" ad is an ad that links the user to a landing page within the publisher's website, for example, where an advertiser pays for placing an ad on the publisher's website. The content (or creative content) of the click-in ad may be provided by the publisher and/or the advertiser.

Relevance Types

According to another aspect, visitor intent at an e-commerce website is associated with one or more relevance types. A relevance type describes a benefit enjoyed by the visitor that may be derived from receiving an advertisement that is targeted to the specific intent of the visitor. The relevance type defines a relationship between the ad and an intended target of the ad. Each ad may have one or more relevance types associated to it.

As will be discussed in further detail below, there may be multiple relevance types including, but not limited to, retailer discovery, substitute discovery, and complement discovery. It should be understood that these relevance types are merely exemplary and that other types are also possible.

In one embodiment, visitor intent may be associated with a relevance type of retailer discovery. Retailer discovery is relevant to the intent where an ad provides information about one or more retailers where the intent can be satisfied (e.g., retailers of a specific product or related product). For example, if the intent of the visitor is to purchase a Samsung LCD TV, an ad stating "Shop Samsung TVs at newegg.com" may be relevant to the intent because it enables the visitor to discover a retailer that can satisfy the intent.

In another embodiment, visitor intent may be associated with a relevance type of substitute discovery. Substitute discovery is relevant to the intent where an ad provides information about other products that may also satisfy the intent (e.g., similar and/or comparable products that are sold by other retailers). For example, as above, if the intent is to purchase a Samsung LCD TV, an ad stating "Sony TVs have the clearest picture" or "Sale on plasma TVs" may be relevant to the intent because it enables the visitor to discover substitute brands or products that can satisfy the intent.

In yet another embodiment, visitor intent may be associated with a relevance type of complement discovery. Complement discovery is relevant to the intent where an ad provides information about products that complement the intent (e.g., accessories, product-related services). For example, as above, if the intent is to purchase a Samsung LCD TV, an ad stating "Fast and reliable TV home installation services" or "Blu-Ray Disc players" may be relevant to the intent because it enables the visitor to discover services and/or products that are complementary to the intent.

In one embodiment, one or more ads are associated with a relevance type based on an intent or based on the content of a web page. The publisher may choose one or more of the relevance types to control or limit which types of ads are displayed on their website. For example, the publisher may choose to display only ads having a relevance type of complement discovery.

In another embodiment, a relevance type is associated with an intent dynamically, for example, by the media platform. For example, the media platform may associate an ad to one or more relevance types based on known or predicted relationships.

As discussed above, more than one relevance type may be appropriate for an ad. In one example, an electronics retailer is advertising a Blu-Ray disc player. If the intent of a visitor is to purchase a flat screen TV, then the ad may be relevant for complement discovery because the disc player is commonly purchased in conjunction with the TV, and because the disc player can be purchased from the electronics retailer. If the intent of the visitor is to purchase a Blu-Ray disc player, then the ad may be relevant for retailer discovery because the disc player can be purchased from the electronics retailer. If the intent of the visitor is to purchase a Samsung Blu-Ray disc player (i.e., a specific product), then the ad may be relevant for substitute discovery because another brand of disc player can be purchased from the electronics retailer.

In another example, a restaurant is advertising itself. If the intent of a visitor is to reserve a hotel room in New York, the ad may be relevant for complement discovery because the restaurant is in New York (or near the hotel) and the visitor will likely be dining out while staying at the hotel. If the intent is to purchase airline tickets to New York, the ad may also be relevant for complement discovery because the visitor is likely to be dining out after flying to New York. If the intent is to locate restaurants in New York, the ad is relevant for retailer discovery because the ad is for a restaurant. If the intent is to locate a steakhouse in New York, the ad may be relevant for substitute discovery if the restaurant serves steak, but is not a traditional steakhouse.

In one embodiment, a relevance type of an ad is assigned by an advertiser. In another embodiment, a relevance type of an ad is automatically or semi-automatically assigned. Such automatic or semi-automatic assignments may be facilitated at least in part by the relevance type assigned to the ad by the advertiser. For example, a database including mappings between types (or classes) of advertisements and normalized intent targets may be used to assign a relevance type to an ad based on the intent of a visitor. The mappings may be created or modified based on the manual assignment of a relevance type to an ad by, for example, an advertiser.

Translation

According to one aspect, it is appreciated that advertising may target a specific intent of a website visitor, as opposed to targeting more general characteristics of the visitor or the products that the visitor is searching for. Targeted advertising may be enabled by translating a search performed by the visitor (or from other information received from the visitor) into an intent target that is normalized across a vertical e-commerce market. Such normalization facilitates the ability to serve targeted ads to multiple publishers because each publisher may utilize diverse nomenclature in describing visitor intent.

In one embodiment, a publisher solicits advertising from one or more advertisers by providing data representing a context of a visitor to an e-commerce website that is published by the publisher. The context may include an intent of the visitor, or information from which the intent may be determined. The context may also include an intent stage (or process context) of the visitor, which relates to the interaction of the visitor to the e-commerce website, as described below. The context is then parsed and translated or normalized into a common taxonomy that is applicable across multiple advertisers operating within, for example, a vertical market (e.g., travel: flights, hotels, rental cars, etc.). The normalized data may represent a specific intent of the visitor that may be used to identify relevant advertisements that target the intent. For example, if the intent of the visitor is to purchase airline tickets from Dallas/Fort Worth to Chicago, departing on Jan. 13, 2009 and returning on Jan. 20, 2009, the data representing this intent may be normalized as {ORIGIN=DFW; DESTINATION=ORD; DEPART=01-13-09; RETURN=01-20-09}. Such normalized intent data facilitates the identification of ads relevant to the intent across multiple publishers and/or advertisers, for example, ads for airline tickets that specifically target the desired itinerary of the visitor.

In another embodiment, visitor intent is represented by one or more keywords. For example, a visitor entering "flights from Boston to Miami" is expressing an intent to locate flights from Boston to Miami. These keywords may be translated into normalized intent data as described above, for example, {MODE=AIR; ORIGIN=BOS; DESTINATION=MIA}.

According to one embodiment, when a visitor visits an e-commerce website, an ad request is provided by a publisher of the website to a translation engine. The ad request may contain, for example, one or more keywords or search terms supplied by the visitor. The translation engine parses the ad request into one or more normalized attributes and/or values, and translates the normalized attributes/values into an intent target. The intent target may then be used to generate one or more synonymous intent targets. The intent target and/or synonymous intent targets may be used, for example, to identify, from among a group of advertisements, one or more candidate advertisements to be displayed to the visitor.

In another embodiment, an ad request provided by a publisher contains one or more variables representing one or more aspects of visitor intent, such as keywords or search terms provided by the visitor. The translation engine parses the attributes and/or values of each variable into one or more normalized attributes or values. For example, in a first travel service website, one variable may have the attribute of "ORIG" to represent the visitor's city of origin, and in a second travel service website, one variable may have the attribute of "DEP" to represent the same departure city. Each of these attributes, and others, may be parsed into a normalized attribute of "ORIGIN," which indicates that the corresponding value of the variable represents the visitor's city of origin. In another example, a variable may have the value of "BOS" (IATA airport code), "KBOS" (ICAO airport code), "Boston" (airport city name), or "Logan International Airport" (airport name). Each of these values may be parsed, for example, into a normalized value of "BOS," which indicates that the value represents Boston's Logan Airport. In this manner, the intent is normalized across all publishers regardless of the form of the variable attribute as received from the publisher, which may vary from one publisher to another.

In another embodiment, an ad request provided by a publisher contains one or more variables representing a process context of a visitor, such as a URL indicating where the visitor is interacting within the e-commerce website. A translation engine parses the context into a normalized value. For example, the URL, when parsed, may provide information about the visitor's activity on the website, such as whether the visitor is searching for a product (e.g., locating and/or researching the product), selecting the product (e.g., placing the product into a "shopping cart"), or purchasing the product (e.g., "checking-out"). The URL, or components thereof, may be parsed into a normalized context representing the visitor's context, such as "SHOPPING," "SELECTING," or "PURCHASED." In this manner, the visitor's context is normalized across all publishers regardless of the form of the URL received from the publisher, which may vary from one publisher to another.

According to another aspect of the disclosure, a translation engine translates a structured advertising campaign into one or more keyword campaigns. The keyword campaigns may contain normalized keywords. The keyword campaign translation facilitates serving ads drawn from an ad campaign, which target a specific intent, to visitors having the specific intent by matching the intent to certain keywords. Those keywords may be mapped to respective ads in the ad campaign. For example, an electronics retailer may submit to, for example, a media system 300 as discussed above with reference to FIG. 3, an advertising campaign featuring a particular model of Sony televisions. The translation engine of media system 300 converts the advertising campaign into one or more keywords relevant to the television model being advertised, such as screen size, screen type, and bezel color. The keywords may then be used, for example, matching an intent of a visitor to the advertising campaign. For example, if the visitor enters one or more of the relevant keywords, an advertisement request including the keywords may cause an ad from the ad campaign (e.g., an ad for the particular television model) to be displayed to the visitor.

Segmentation

According to one aspect, visitors to an e-commerce website are segmented into multiple groups. In one embodiment, segmentation may be used to identify a relationship between a user and a publisher of a website. In one non-limiting example, a user may be a visitor having low value to the publisher, that is, a visitor who is expected to generate little to no net transaction revenue or advertising revenue for the publisher, and therefore has a low value to the publisher. In another example, a user may be a loyalty program member who has a high value to the publisher. Segmentation of visitors may be used to facilitate a decision as to whether an advertisement is served to a particular visitor. Segmentation may be used in conjunction with a hurdle rate calculation (described in further detail below) or alone.

In one embodiment, visitors are segmented into two groups: high value visitors (HVV) and low value visitors (LVV). Information regarding visitors may be supplied by the publisher. The value of the visitor is defined with respect to the publisher. For example, a HVV may be a visitor who is likely to complete a transaction with the publisher if no ad is served. A LVV, on the other hand, may be a visitor that is less likely to complete a transaction with the publisher than a HVV is. In another example, a HVV may be a visitor who has previously made a purchase at the website or from the merchant (intent), a registered user of the website (status), or a loyalty program member (status). A LVV may be a visitor who is not a HVV. A LVV, for example, is a visitor who expresses an intent to locate a product but is likely to leave the website without purchasing the product. It should be understood that these groupings are exemplary and that other or additional groupings are possible.

In another embodiment, no ads are displayed to a HVV because the potential risk of cannibalizing revenue from the HVV is high if an ad is displayed, or the risk is at least above a predetermined threshold set by the publisher. This risk threshold may be, according to one embodiment, included in a determination of whether the visitor is a HVV.

In yet another embodiment, segmentation may be based on known and/or available information about a visitor. Such information may include information provided by a publisher regarding the visitor, such as whether the visitor is a past purchaser or a loyalty program member. Other information may be defined and/or provided by the publisher that may be used for segmentation. Segmentation may be based on information that includes, but is not limited to, intent variables (e.g., search or purchase data), user variables (e.g., user status), media unit type (e.g., standard ad unit, integrated ad unit, comparison shopping widget, e-mail, pop-up or pop-under window), analytics hooks (e.g., pixeling or scripting), process context mapping (e.g., location of user within process), intent mapping (e.g., normalized intent), hurdle rate, exclusions, and other data.

In another embodiment, segmentation may be based on historical data provided by a publisher and/or collected by another source. Such information may include, for example, sales trends for one or more products, conversion rates (completed transactions versus uncompleted transactions), or other data relevant to the intent, behavior, and/or characteristics of a visitor.

In another embodiment, segmentation may be based on information collected by a source other than the publisher. In one example, the source may place a "pixel" (or hook) on one or more web pages of the publisher. The pixel is linked to a program (or script) that collects information about a visitor. The collected information may be used, for example, to create a model that describes the intent, behavior, and/or characteristics of one or more visitors to a particular website or web page for segmentation purposes. The data may be collected from a Document Object Model (DOM) of the web page containing the pixel, or from cookies stored on a client system.

In another embodiment, segmentation may be based on one or more of the following: product; product category; media unit; relevance type; historical behavior, where such behavior includes past purchase history, browsing history, user preferences, demographics, and/or user characteristics; real-time visitor behavior and/or characteristics, where such behavior and/or characteristics includes browsing activity, traffic source (e.g., affiliate, bookmark, paid or organic search, comparison shopping engine, and/or outbound CRM), time of day, day of week, month and/or year, intent stage (e.g., shopping, browsing, bailing-out, post-purchase, and/or post-consumption); and visitor intent. Segmentation of visitors may also be based on visitor behavior across multiple publishers, for example, whether a visitor uses one website to search for a product (e.g., a travel search engine such as the Kayak.com® search engine to locate flights) and another website to purchase the product (e.g., the AA.com® website by American Airlines).

According to another embodiment, segmentation may be combined with a relevance type associated with an intent of the visitor to identify, for a particular ad, whether the visitor is a HVV or a LVV. For example, a visitor who has previously purchased from a website that sells work boots may be classified as a HVV where the intent is to purchase work boots, the relevance type is retailer discovery, and the ad is for another website that sells work boots. If no ad is served to this visitor, there is a greater chance that the visitor will purchase work boots from the website and not from another source because the visitor will not discover alternate retailers or products through advertising at the website. In another example, the same visitor may be classified as a LVV where the intent is to purchase work boots, the relevance type is complement discovery, and the ad is for rain gear, because the visitor has no history of purchasing rain gear from the website and therefore there is a lesser chance that the visitor will make such a purchase.

Hurdle Rate

According to one aspect, it is appreciated that a publisher of an e-commerce website may be reluctant to serve an ad to a visitor if the ad has the potential to cannibalize the expected transaction revenue received from the visitor. For example, a publisher that sells widgets may be unlikely to serve ads for a competitor that also sells widgets, particularly where the competitor offers to sell the widget for less than the publisher. However, it is also appreciated that many visitors to the website are unlikely to make a purchase, and as such the publisher receives no transaction revenue from those visitors whether or not an ad is displayed. Therefore, in an instance where the value of the intent (e.g., the potential media revenue received for an ad targeting the intent) can be determined, the expected transaction revenue a visitor may serve as a basis for determining a hurdle (or threshold) rate. The hurdle rate represents an optimum minimum bid price or minimum combination of bid prices by one or more advertisers for serving an ad, which may be generated in real-time, below which no ad will be served to the visitor.

In one embodiment, a hurdle rate represents a price that is at least as great as the expected transaction revenue received from a visitor who is not served an ad. For example, many visitors to an e-commerce website may shop for airline fares between two cities, but relatively few of the visitors will complete a purchase during their visit. An advertisement that does not target the intent of the visitor may be of lesser value to the advertiser than a targeted ad because there is a lesser chance that the ad will lead to a transaction with the advertiser. On the other hand, highly targeted ads, based on intent, may represent a high value to the advertiser, but also a high risk to the publisher serving the ad because the ad is more likely to draw the visitor away from the publisher and toward the advertiser before the visitor completes a transaction with the publisher. Accordingly, the hurdle rate may represent an optimal balance between transaction and media revenue for a particular visitor, allowing the publisher to monetize the value of the intent where the expected transaction revenue from the visitor is less than the potential media revenue acquired from serving the ad.

In another embodiment, a hurdle rate is based at least in part on an intent and/or intent stage (or process context). The intent stage includes shopping (e.g., viewing a product browse page, search results page, product list page, product detail page, and/or an e-mail, or where the visitor has "bailed-out" or exited the website) and post-purchase (e.g., transaction confirmation or follow-up). As described above, the hurdle rate reflects a price at which potential media revenue meets or exceeds the expected transaction revenue from a visitor. In turn, the expected transaction revenue may be determined based on the visitor's intent or intent stage. For example, for a visitor who is merely browsing products at the website, the expected transaction revenue may be low because it is uncertain if the visitor will complete a purchase of any product. However, once the visitor narrows his or her search to a particular product (or products), confidence may increase that a transaction will occur, and thus the expected transaction revenue for the visitor may increase. If the visitor begins the transaction process, the expected transaction revenue again increases. Therefore, the hurdle rate increases as the expected transaction revenue increases.

According to one embodiment, a hurdle rate is calculated based on one or more of the following data: product cost, product price, product value, number and quality of visitors, number of sellers, historical average conversion rate for a particular intent target, average contribution margin for a completed transaction for a particular intent target, adjustment rules for each user segment and/or behavior, adjustment rules for one or more intent stages, publisher input (e.g., preferences, knowledge, capability), product inventory, or other data. For example, the data may be acquired from the publisher or another source. In another example, the data (e.g., conversion and/or contribution data) may be acquired through an analytics hook, such as a "pixel" on the publisher's website.

In one embodiment, a hurdle rate is based on an expected transaction revenue where no ad is served to a visitor less an expected transaction revenue where an ad is served to the visitor. For example, if the expected transaction value where no ad is served is $14 and the expected transaction value where an ad is served is $9, the hurdle rate is $5. The hurdle rate may establish the minimum value of an ad for a given intent target and/or context target. Ads having bids below the hurdle rate will not be served.

In another embodiment, a hurdle rate is the minimum amount of media revenue a publisher must receive to offset an expected loss in revenue from transactions (e.g., transactions occurring with others than the publisher) or other media (e.g., advertisements). For example, in a multi-click ad unit (described in further detail below), multiple advertisers may be bidding for placement of ads within an individual ad unit (e.g., a comparison shopping widget having two or more advertisers providing advertising based on a common set of attributes, such as intent, keywords, or other visitor-supplied search terms). In this example, the total of all bids received must exceed the hurdle rate before an ad is served. Accordingly, one or more of the bids may be less than the hurdle rate for certain ad units (e.g., a multi-click unit or an ad unit having multiple advertising spots); however, all of the ads in the ad unit will be served if the combined bids exceed the hurdle rate for the ad unit.

In yet another embodiment, adjustments to the hurdle rate may be applied. For example, the hurdle rate may be adjusted upward or downward based on a status of the visitor (e.g., loyalty program member, return visitor, registered visitor, or other status) and/or a process context of the visitor (e.g., visitor is on home page, product list page, product details page, or other page). A hurdle rate formula may be expressed, for example, as:

> Hurdle rate=(average conversion rate)*(segmentation/behavior conversion adjustment)*(intent state conversion adjustment)*(average contribution margin)*(segmentation/behavior contribution margin adjustment)*(intent state contribution margin adjustment)

It should be understood that the above formula is exemplary, and that one or more variables may be added, modified, or deleted.

In another embodiment, a hurdle rate may be based on other rates, such as a publisher-calculated rate or a publisher-calculated adjustment rate.

In one embodiment, a hurdle rate is calculated by the media platform, such as media platform 201 as discussed above with reference to FIG. 2. The calculation may include data provided by the publisher, the media platform, and/or another source. In another embodiment, the hurdle rate is provided to the media platform by the publisher. The hurdle rate may be the higher (or lower) of the publisher-provided hurdle rate and the calculated hurdle rate. In yet another embodiment, a hurdle rate adjustment is provided by the publisher and incorporated into the hurdle rate calculation.

In yet another embodiment, a hurdle rate may include an adjustment to "boost" the hurdle rate. The adjustment may be a numerical adjustment or a percentage-wise adjustment.

In still another embodiment, a hurdle rate may be based on a return rate. The return rate represents the percentage of visitors to a first website who return to the first website after following an ad viewed on the first website which directed the visitor to a second website (e.g., an advertiser's website). The returning visitor may or may not complete a transaction at the first website. For example, the return rate may represent a "return to visit" rate or a "return to purchase rate." A return to visit rate is the rate at which a visitor returns to visit the first website after leaving the first website to visit another site (e.g., by clicking on an ad), but subsequently makes no purchase at the first website. A return to purchased rate is the rate at which a visitor returns to purchase a product from the first website after leaving the first website.

According to another embodiment, a hurdle rate represents the fully loaded expected value (FLEV) associated with the intent of a visitor. The FLEV is based on the expected media value of an ad in addition to the expected return transaction value (e.g., the value of a transaction completed by a visitor returning to a first website after following an ad to a second website). The net FLEV may be expressed, for example, as an expected contribution per visitor value less a revenue share value plus a return transaction value.

Figure 5:
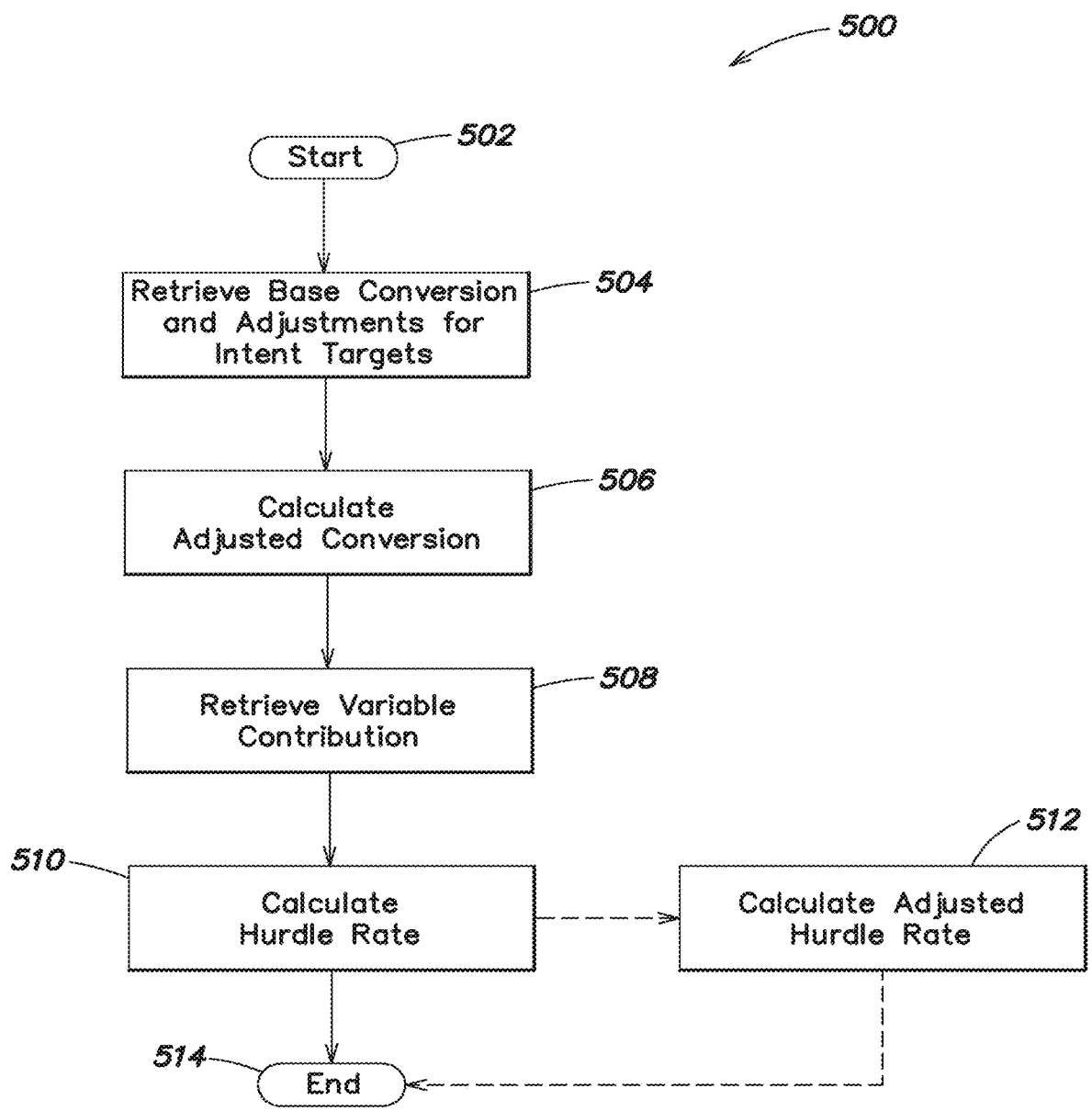
FIG. 5 illustrates an exemplary process for calculating a hurdle rate in accordance with one embodiment of the present disclosure.

FIG. 5 illustrates an exemplary process for calculating a hurdle rate 500 in accordance with one embodiment. At block 502, process 500 begins. At block 504, a base conversion and adjustments for one or more intent targets and/or process contexts are retrieved. The base conversion and/or adjustments may be retrieved, for example, from a database, such as a hurdle rate database.

According to one embodiment, a base conversion may be based on an intent target. For example, if the intent target is hotels in Dallas, the base conversion may be 2%. The base conversion may be based on a process context. For example, if the intent is hotels in Dallas, and the process context is "SHOPPING", the base conversion may be 2.75%. It will be understood that the conversion values are exemplary and that any values may be used.

According to another embodiment, an adjustment may be based on a characteristic of a visitor. For example, a registered user adjustment may be 300%. In the above example, the base conversion would be adjusted upward by 300% if the user is a registered user.

At block 506, an adjusted conversion rate is calculated based on the base conversion and adjustments, as described above.

At block 508, a variable contribution is retrieved. The variable contribution may be retrieved, for example, from a database, such as a hurdle rate database. In one example, the variable contribution is a fixed dollar amount that is contributed by the advertiser to the hurdle rate. It will be understood that other forms of variable contribution are possible.

At block 510, a hurdle rate is calculated. For example, the hurdle rate may be calculated as the adjusted conversion rate multiplied by the variable contribution.

At block 512, an adjusted hurdle rate is optionally calculated. For example, the hurdle rate may be adjusted to account for revenue sharing by a third party (e.g., the hurdle rate may be increased to cover the amount of revenue to be shared with the third party).

At block 514, process 500 ends.

Candidate List

According to an aspect, a candidate advertisement list is generated by a candidate list engine. The candidate advertisement list includes one or more ads that are selected from a group of ads, for example, ads in an advertising campaign, and that meet certain criteria, for example, ads that target an intent and/or ads having bids that exceed a hurdle rate. The ads in the list include ads that are candidates for display to the visitor based on at least some of the criteria.

The candidate list engine is connected to one or more ad campaign databases. An ad campaign may include one or more of the following: dates (e.g., dates for which the campaign is valid or active), delivery rules, budget, bid groups, placement targets, intent targets, and/or ad creatives (e.g., ad content). The candidate advertisement list includes one or more advertisements selected from the one or more ad campaign databases.

Figure 6A:
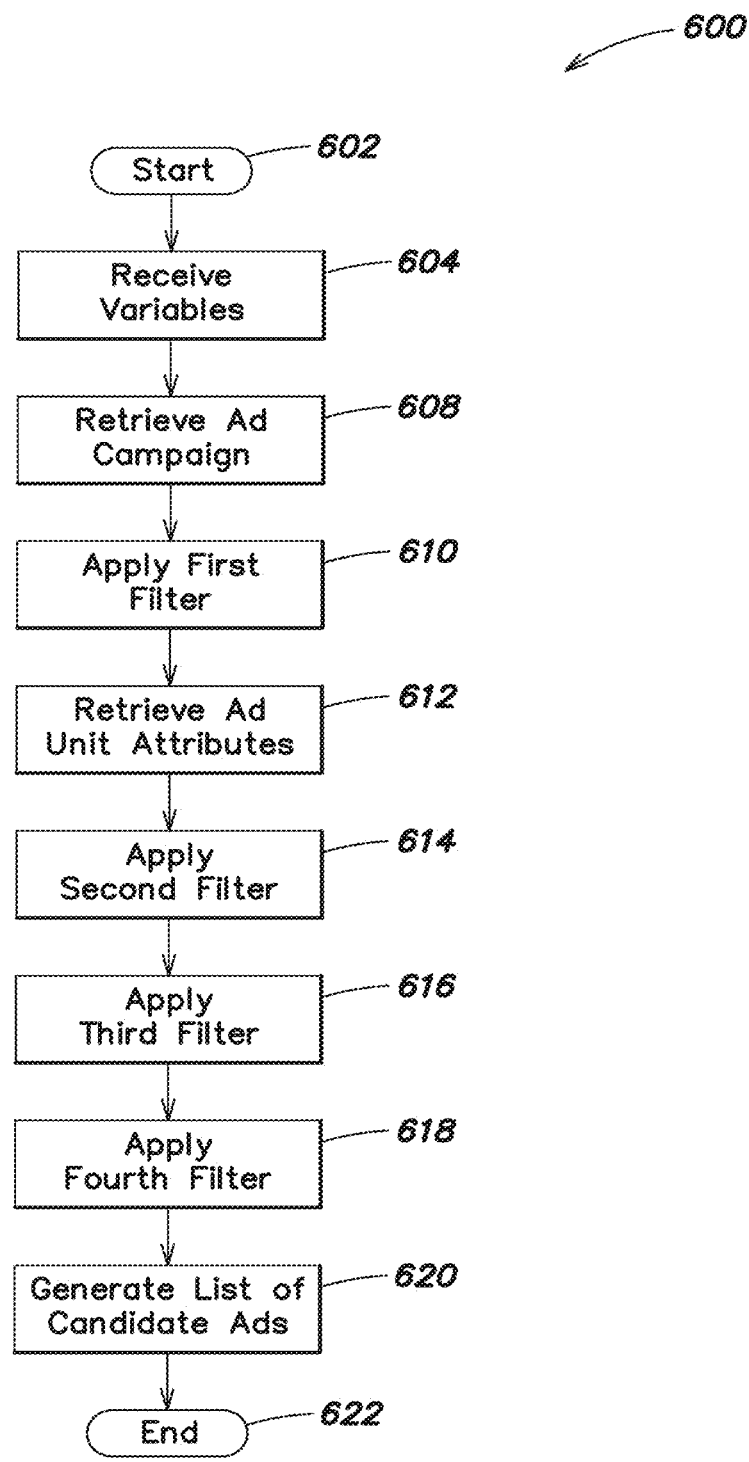
FIGS. 6A-B illustrates exemplary processes for generating a list of candidate advertisements in accordance with one embodiment of the present disclosure.

FIG. 6A illustrates an exemplary process for generating a list of candidate advertisements 600. Process 600 begins at block 602. At block 604, a candidate list engine receives one or more variables each representing one or more of the following: an intent target, a process context, an ad unit identifier, one or more ad unit attributes, a publisher name, a cookie, and a hurdle rate. The intent may be a normalized intent. The variables may be received from a database, for example, an ad campaign database.

At block 608, the engine retrieves, from the database, one or more active ad campaigns where the bid is greater than the hurdle rate. The ad campaigns may include one or more advertisements and other information related to the ads, such as bids, dates, rules, and/or creative content.

At block 610, a first filter is applied. The first filter acts to disqualify one or more ads based on one or more rules. The rules, for example, may include exclusions, ad delivery limitations, and/or eligibility requirements. Other rules may be applied.

At block 612, the engine retrieves, from the database, one or more ad unit attributes. The ad unit attributes may include a media unit type of the ads, for example, a standard ad unit, an integrated ad unit, a comparison shopping widget, or an e-mail.

At block 614, a second filter may be applied. The second filter acts to disqualify one or more ads based on one or more ad unit attributes, where the ads do not match the ad unit attributes. Ad unit attributes may describe, for example, the format (e.g., size, style, etc.) of the ad. For example, if the publisher requests only integrated ad units, then ads that are not integrated ad units will be disqualified.

At block 616, a third filter may be applied. The third filter acts to disqualify one or more ads based on the intent. For example, if the ad does not target the intent, it may be disqualified. Alternatively, if no ads target the intent, the third filter may be relaxed. For example, if the intent is specific, such as "flights between 5:00 PM and 8:00 PM," and no ads match the intent, then the third filter may be relaxed to allow ads targeting "flights between noon and midnight" to pass through the filter. This prevents the list of candidate ads from becoming eviscerated by specific intents.

At block 618, a fourth filter may be applied. The fourth filter acts to disqualify one or more ads based on the process context. In one example, the process context represents a normalized context of a visitor, as described above, such as "SHOPPING," "SELECTING," or "PURCHASED." If the ad does not match the process context, it may be disqualified. Alternatively, if no ads match the process context, then the fourth filter may be relaxed. For example, if the process context is later in time, such as "PURCHASED," then the fourth filter may be relaxed to allow ads targeting a process context of "SHOPPING" and/or "SELECTING" to pass through the filter. In one embodiment, the filter is relaxed to include one or more prior process contexts, that is, to include any process context that is earlier in time than the current process context. This prevents the list of candidate ads from becoming eviscerated by process contexts that are later in the process.

At block 620, a list of candidate ads is generated. The list of ads may include one or more ads that are not disqualified. If the list of candidate ads contains no ads, then no ad is displayed to the visitor. Otherwise, the list of candidate ads may be passed to an ad optimization engine, which is described below. Process 600 ends at block 622.

Figure 6B:
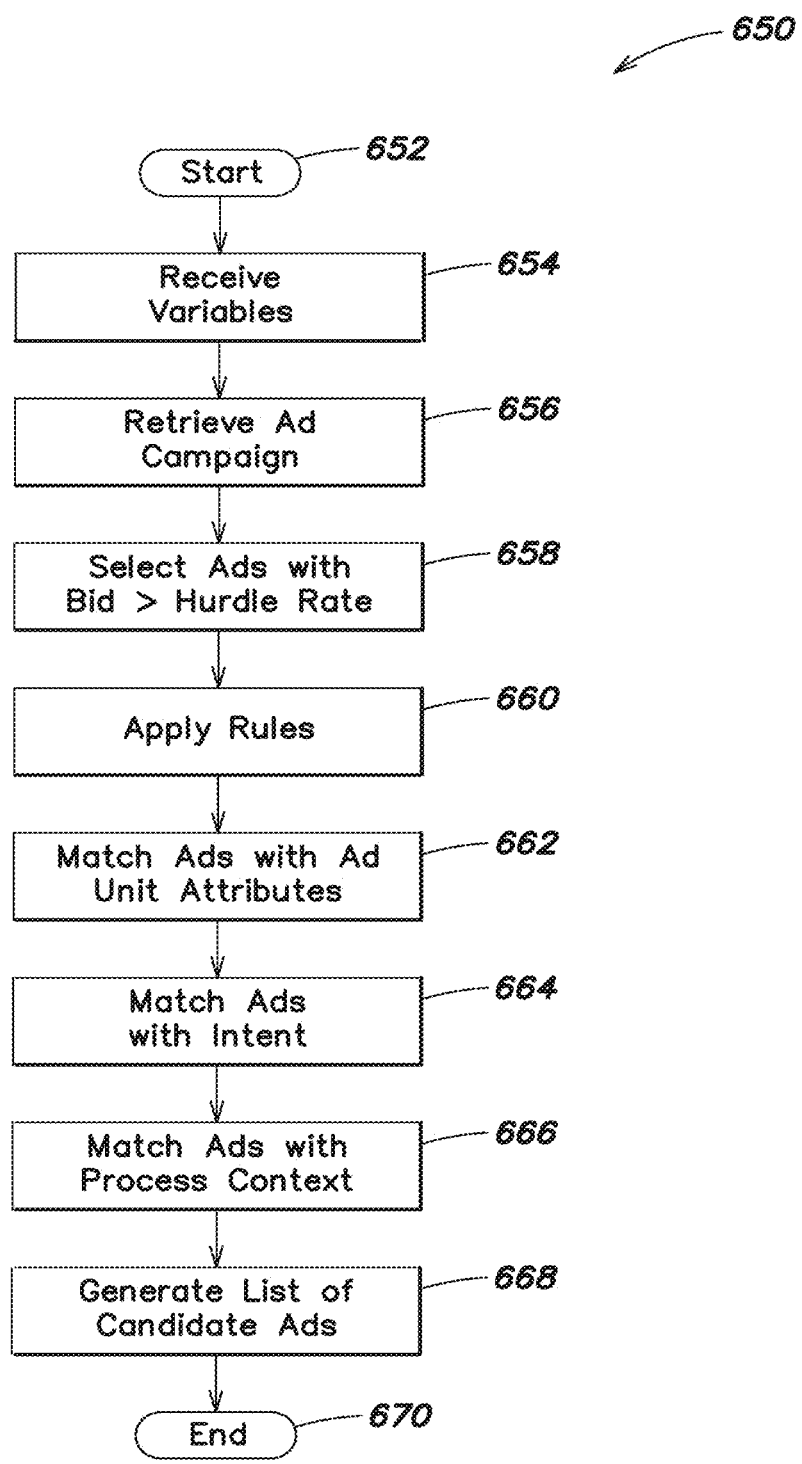

FIG. 6B illustrates another exemplary process for generating a list of candidate ads 650. Process 650 begins at block 652. At block 654, a candidate list engine receives one or more variables each representing one or more of the following: an intent of a visitor, a process context, an ad unit identifier, one or more ad unit attributes, a publisher name, a cookie, and a hurdle rate. The intent may be a normalized intent target and/or normalized process context.

At block 656, the engine retrieves, from the databases, one or more active ad campaigns. The ad campaigns may include bids, rules, and/or media unit types associated with each of the ads. At block 658, the engine selects, from the active ad campaigns, one or more ads where the bid exceeds the hurdle rate. At block 660, the engine further selects one or more ads that meet one or more rules, where the rules may define one or more criteria related to the ad campaign.

At block 662, the engine further selects one or more ads that match the one or more ad unit attributes. At block 664, the engine further selects one or more ads that match the intent. At block 666, the engine further selects one ore more ads that match the process context.

At block 668, a list of candidate ads is generated. The list of ads may include one or more of the selected ads. If the list of candidate ads contains no ads, then no ad is displayed to the visitor. Otherwise, the list of candidate ads may be passed to an ad optimization engine, which is described below. Process 650 ends at block 670.

Ad Optimization

Figure 7:
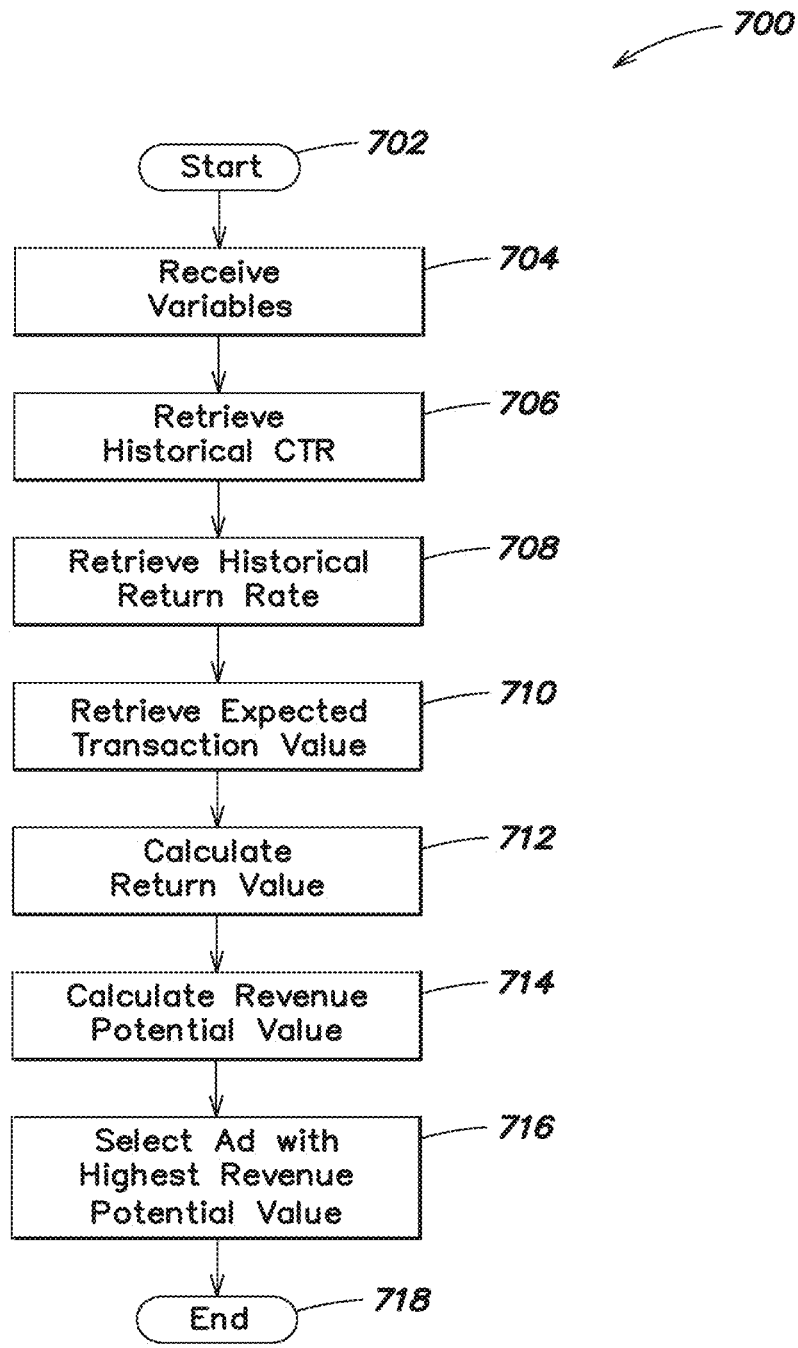
FIG. 7 illustrates an exemplary process for optimizing ad selection in accordance with one embodiment of the present disclosure.

FIG. 7 illustrates an exemplary process for optimizing ad selection 700. One or more ads within a list of candidate ads may possess characteristics that may provide for an optimal CPV. Non-limiting examples of ads that may have an optimal CPV include ads having the highest bids, ads selected for display to a low value visitor, ads selected for display to visitors having a low expected return to purchase value, and other factors that may be based on historical data. In one non-limiting example, an expected return to purchase value may be a value that is assigned to a visitor based on the likelihood that the visitor will, after viewing an advertisement on a website, return to the website to complete a transaction. If the visitor is unlikely to return to purchase, then the expected return to purchase value may increase as a result of the diminished likelihood that the visitor will complete a transaction at the website if an ad is displayed to the visitor. Accordingly, there will be no transaction revenue received from the visitor if displaying an ad causes the visitor to leave the website without purchasing anything. Therefore, a higher expected return to purchase value may allow the publisher of the website to recover any potential loss in transaction revenue resulting from displaying an ad by setting a hurdle rate (or minimum bid) at least as high as the potential loss in transaction revenue. Thus, according to one embodiment, a hurdle rate calculation may be based on the expected return to purchase value of a visitor to a website.

As shown in FIG. 7, process 700 begins at block 702. At block 704, an ad optimization engine receives one or more of the following from a database: a list of candidate ads, a hurdle rate, and one or more bids, each bid associated with one of the ads in the list of candidate ads. The optimization engine selects, from the list of candidate ads, one or more optimal ads each having the highest revenue potential and/or the highest associated bid. In one example, the optimization engine determines a value for each ad in the list of candidate ads, assigns a rank to each ad, and provides one or more of the ads to a decision engine (described below).

At block 706, the ad optimization engine retrieves, from a database, a historical CTR for each ad and/or advertiser in the list of candidate ads. At block 708, the ad optimization engine retrieves, from the database, a historical return rate for each ad and/or advertiser in the list of candidate ads. At block 710, the ad optimization engine retrieves, from the database, an expected transaction value.

At block 712, the ad optimization engine calculates a return value. The return value may be, for example, calculated as the expected transaction value times the return rate.

At block 714, the ad optimization engine calculates a revenue potential value for each ad in the list of candidate ads. The revenue potential value may be, for example, calculated as the bid times the CTR, increased by the return value.

At block 716, the ad optimization engine selects one or more ads having the highest revenue potential. Process 700 ends at block 718.

In another embodiment, the ad optimization engine selects one or more ads based on a natural search position of the visitor, for example, a process context. For example, if the process context is "purchased," ads that are relevant to complement discovery may be more optimal than ads that are relevant to retailer discovery because the former possesses a greater value to the publisher than the latter.

In another embodiment, the ad optimization engine generates, for an ad in the list of candidate ads, a link to a web page. The link may be included with the ad, for example, as a hyperlink embedded in the ad. The link may be dynamically generated based, for example, on intent or other information, to lead a visitor to a targeted ad located on the web page.

Ad Decision

According to an aspect, an ad decision engine receives one or more ads having the highest revenue potential and/or a bid rate exceeding the hurdle rate. In one embodiment, if any of the ads having the highest revenue potential meet or exceed the hurdle rate, one or more of the ads having the highest revenue potential are served to a publisher for display to a visitor.

Exemplary System

Figure 8:
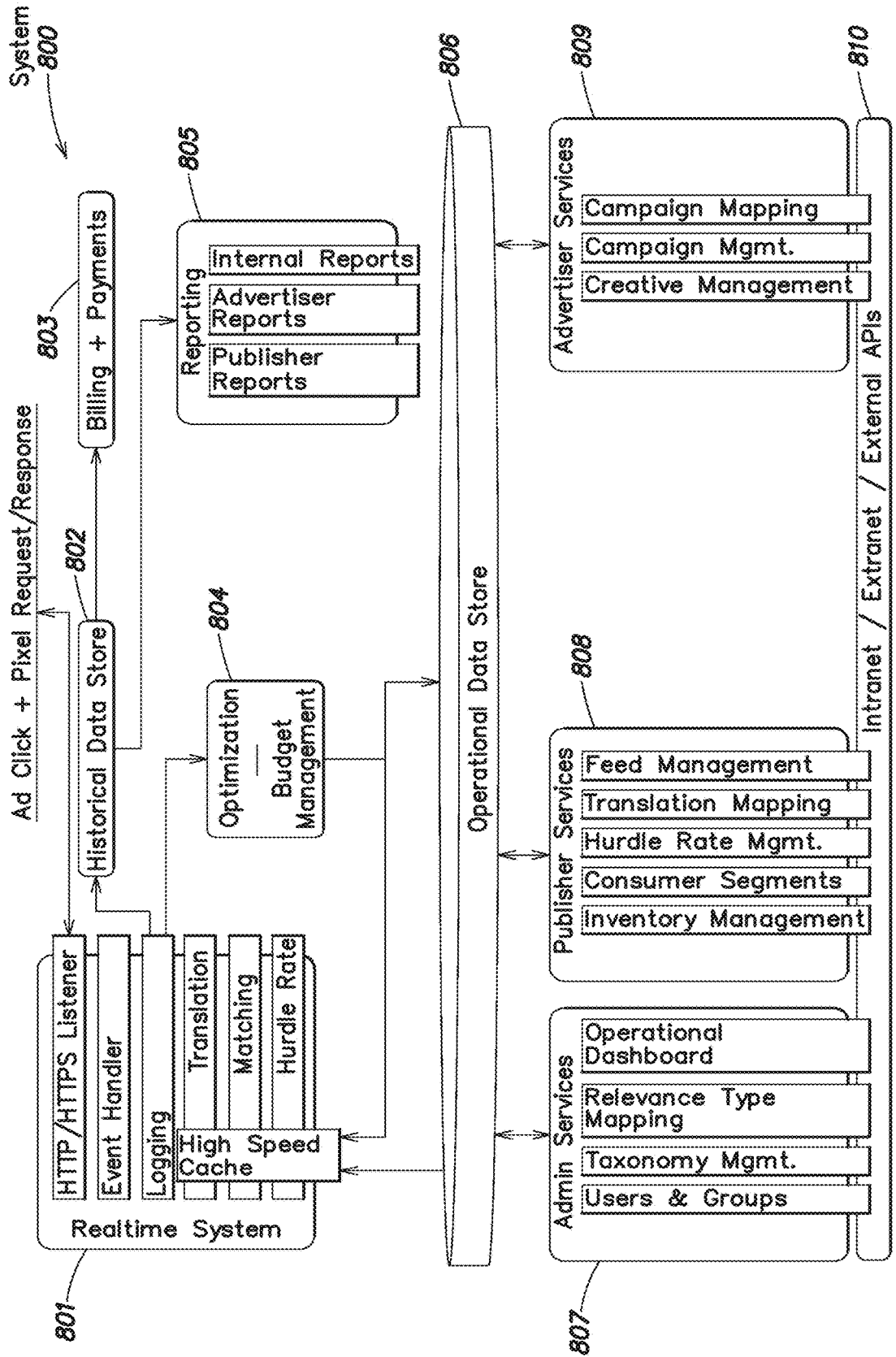
FIG. 8 illustrates an exemplary system for delivering advertising in accordance with one embodiment of the present disclosure.

FIG. 8 illustrates one embodiment of a system 800 that is capable of delivering advertising according to various embodiments of the present disclosure. As shown, system 800 may include one or more components that perform one or more functions. These components can be arranged in other configurations and groupings, and other configurations and groupings may be possible. According to one embodiment, system 800 includes a real-time system 801 including one or more components that perform various functions in real-time. For instance, real-time system 801 may include an HTTP/HTTPS listener, an event handler that is capable of handling events relating to the handling of advertisements, logging component that logs information and events, among others. Notably, system 801 may include components that perform hurdle rate calculations, matching of advertisements, and/or translation into context/intent targets as discussed above.

System 800 may also include other components, including, but not limited to a historical data store 802 that includes historical information relating to the serving of advertisements in relation to determined intent of a user. System 800 may also include a component 803 that handles billing and payment functions. System 800 may also include a component 804 that performs optimization functions to permit the optimization of a particular internet publisher's profit. Further, system 800 may also include, for the benefit of a publisher, advertiser, or system administrator, a number of reports that relate to the functions and performance of system 800.

System 800 may also include an operational data store 806 that is adapted to store configuration information and data used by system 800. Store 806 may be coupled to one or more components that use store 806 to manage data. System 800 may also include a number of other components that permit a publisher, an advertiser, or system administrator to perform various functions within system 800. Such components may be configured using one or more interfaces configurable through an Extranet, Intranet, Internet, or Application Program Interface (API).

For instance, some administrative functions that may be performed include the administration of groups, management of taxonomy, relevance type creation and mapping, and/or monitoring and control of system 800 using an operational dashboard or other control type. Some publisher functions that may be performed may include inventory management, consumer segment management, hurdle rate management, translation mapping management, and advertising feed management. Some advertiser services that may be performed include campaign management, campaign mapping, and/or creative management.

Comparison Shopping Widget

In an embodiment, the media unit type (ad type) is a comparison shopping widget (also referred to herein as a multi-click ad unit). A comparison shopping widget is an interface that allows a visitor to perform a single search that matches the intent of the user or other search criteria across multiple retailers or merchants. For example, a box is displayed containing multiple advertiser names and check boxes next to each name. If the visitor selects any check box, the search will be performed for each of the selected advertisers, and the results of the search by each advertiser are then returned to the visitor. The returned search results may be displayed on the same webpage or on a different webpage.

Figure 9A:
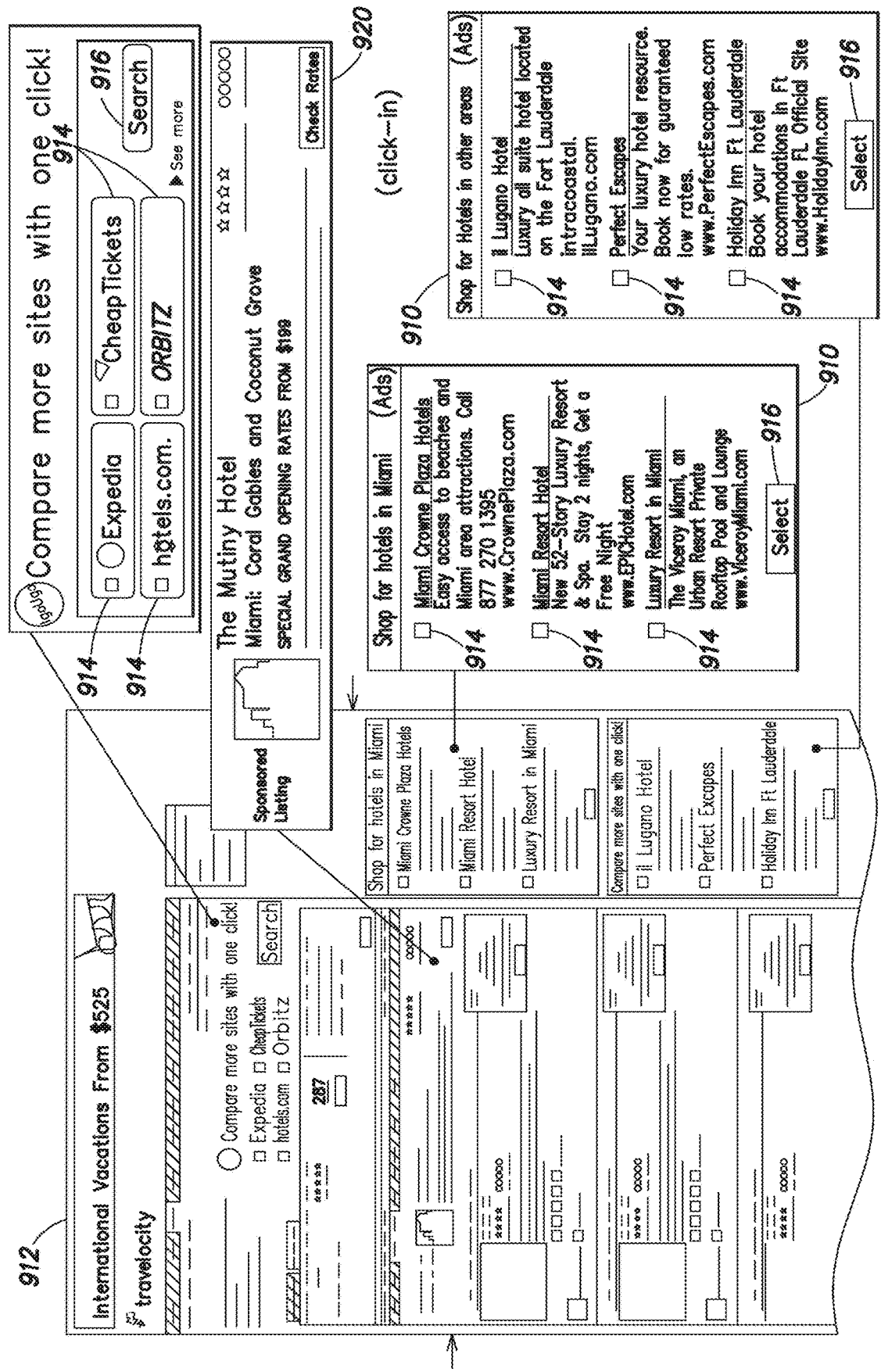
FIG. 9A illustrates an exemplary interface for a comparison shopping widget in accordance with one embodiment of the present disclosure.

FIG. 9A illustrates an exemplary interface for a comparison shopping widget 910. A web page 912 includes the widget 910. Widget 910 may be located within one window of the interface (e.g., a "primary" window), or within a separate window of the interface (e.g., a "pop-up" or "secondary" window). Widget 910 may have one or more advertiser selection controls such as check boxes 914 located proximate to an advertiser name, and a search button or select button 916. It should be understood that selection controls are not limited to check-boxes, for example, radio buttons or other similar controls may also be used.

In one embodiment, widget 910 includes a list of one or more advertiser names, and a corresponding check-box for each advertiser name. When the visitor chooses to request a search using widget 910, the search will be performed for or by each of the selected advertisers. In another embodiment, widget 910 may include additional information, including specific information related to information previously provided by the user. For example, if a visitor has already begun to search for airline flights from Tuscaloosa to Tahiti, widget 910 may include "Tahiti Royal Hotel, Stay 2 nights, Get 1 night free!" along with a corresponding check-box. A web address, phone number, or other advertising information may also be supplied.

According to one embodiment, when a visitor selects one or more of the check boxes 914 and clicks on the search button 916, a search is performed by or for each of the selected advertisers. The search includes search terms that may be provided, for example, by the visitor on the web page 912. Search terms may also be dynamically generated based on other information received from the visitor, such as the user's frequent flier status, travel preferences, purchase history, or similar visitor-specific information. The results of the search (for example, an ad 920) may be provided within the web page 912 or in another, separate web page (not shown) hosted by a publisher of the website or by another publisher.

Figure 9B:
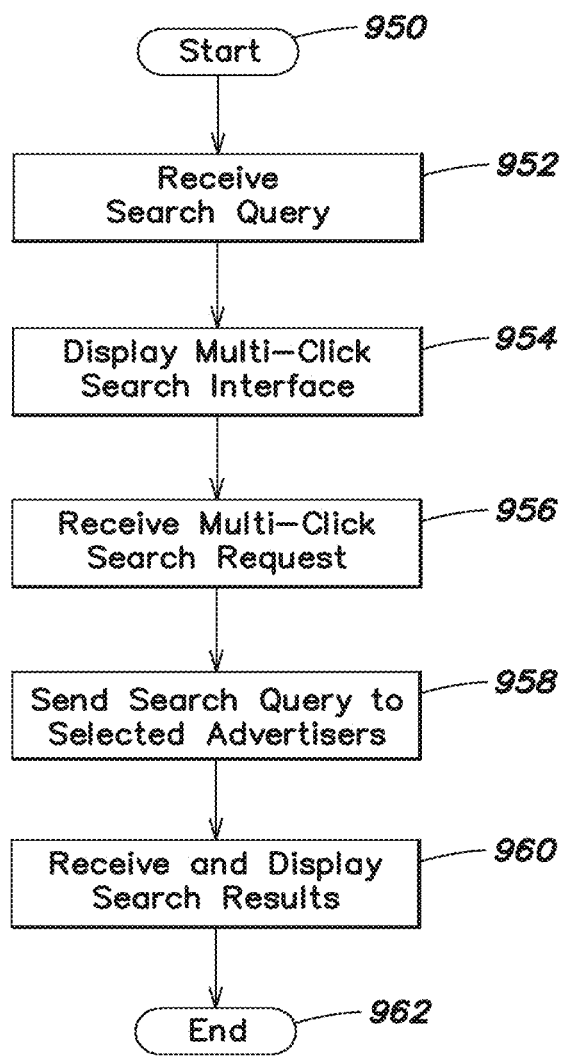
FIG. 9B illustrates an exemplary method of one implementation of a consumer shopping widget in accordance with one embodiment of the present disclosure.

FIG. 9B illustrates an exemplary method of one implementation of a consumer shopping widget. An exemplary process begins at block 950. At block 952, a search query is received. The search query may be generated by a visitor interacting with an e-commerce website, such as a travel search website, and sent to a media platform, such as media platform 201 shown in FIG. 2. For example, the visitor may request a search for hotel rooms in Times Square, New York City.

At block 954, a multi-click search interface is displayed to the user in an interface of, e.g., a client computer. The multi-click search interface may be generated by, for example, media platform 201 (as shown in FIG. 2), by a publisher of the e-commerce website, or by a third-party. The multi-click search interface may be similar to widget 910 as described in FIG. 9A. For example, the multi-click interface may display one or more advertisers of hotels in New York City, or more specifically, in or near Times Square, along with a corresponding check-box for each advertiser. The multi-click interface may also include a search button (e.g., a button labeled "SEARCH"), or other activation control, to request search results from any of the selected advertisers.

At block 956, a multi-click search request is received, for example, by media platform 201. The request may be generated, for example, by a visitor selecting one or more advertisers in a multi-click search interface and also by selecting a search or execute button. At block 958, the search query received above at block 952 may be sent to, for example, each of the selected advertisers, or to another search service (e.g., a search service that performs a search on behalf of the advertiser, which may be the same search service that provides content for the e-commerce website).

At block 960, results of the search query request may be received by one or more of the selected advertisers and displayed to the visitor. The search results may be displayed, for example, in a single window of a web page, or in separate windows. At block 962, the process ends.

Exemplary Media Platform Components

Figure 10:
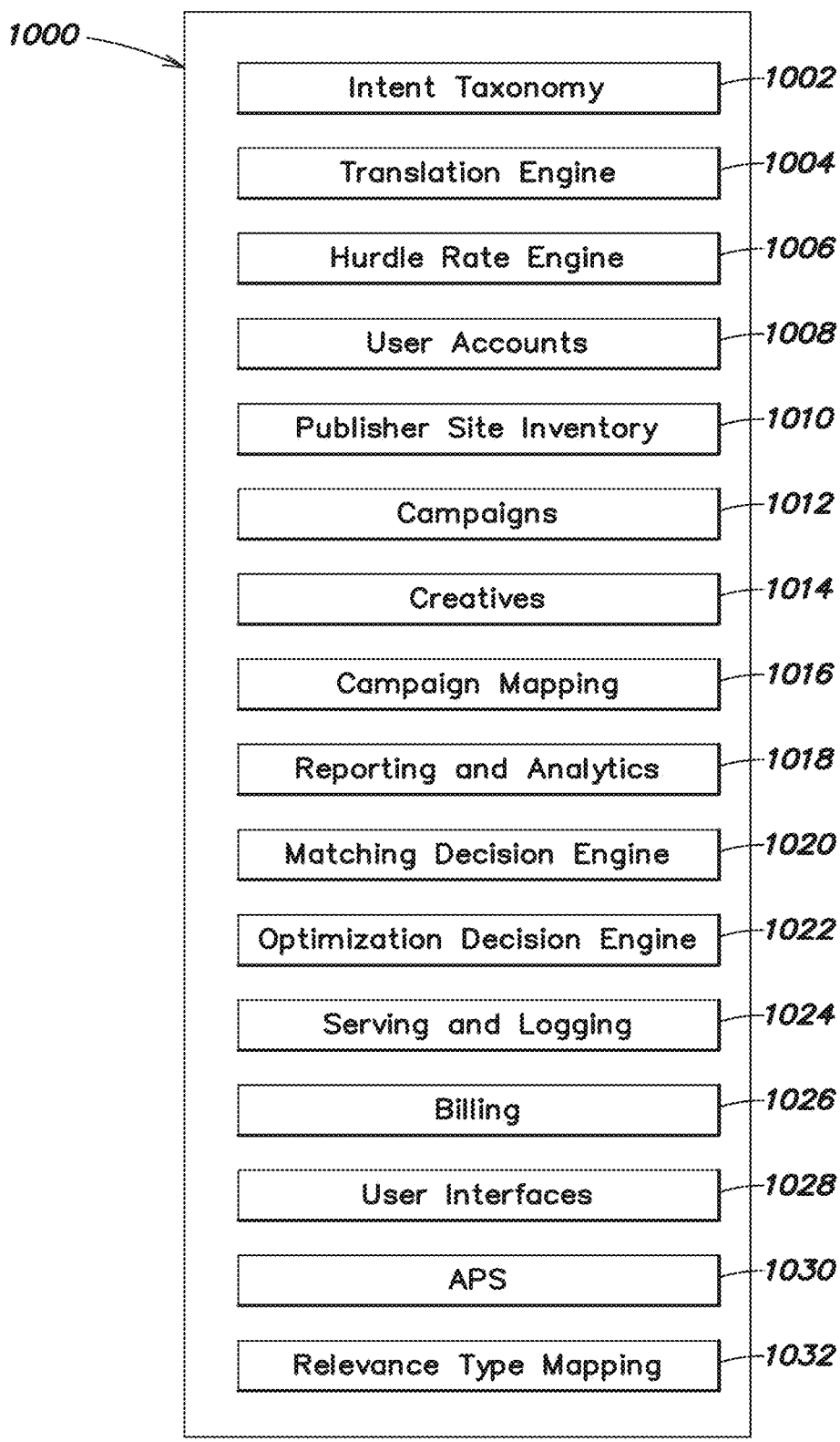
FIG. 10 illustrates an exemplary media platform in accordance with one embodiment of the present disclosure.

FIG. 10 illustrates an exemplary media platform 1000 comprising one or more of the following components:

An intent taxonomy component 1002 allows for the creation and management of a structured library of intent targets and intent stages (or process contexts), which is referred to as an intent taxonomy. The intent targets and/or intent stages may be categorized by a vertical market (e.g., travel, electronics). The intent taxonomy includes a data model that enables publishers, advertisers and others to interact with the media platform. The library may be stored in a database.

A translation engine 1004 allows for the creation and management of a mapping of diverse intent targets and/or intent stages into a normalized intent taxonomy. For example, the intent targets and/or intent stages may be provided by the publisher in an ad tag, a cookie, and/or a HTTP header.

A hurdle rate engine 1006 stores hurdle rate inputs such as expected conversion/contribution assumptions for a specific intent, plus adjustment assumptions for variables such as user type, traffic source, intent stage and lifetime value. Hurdle rate inputs can be input manually (i.e. via a file upload and/or UI) or be dynamically learned and/or stored through cookies served by ads or pixels. This component also includes the real-time calculation of hurdle rates (based on the hurdle rate inputs) upon receipt of a publisher ad request.

A user account component 1008 allows for the creation and management of profiles for the various entities participating in the marketplace, including advertisers, publishers, and others. Specific roles, permissions, and other information (e.g., names, contact info, etc.) can be created and managed.

A publisher site inventory component 1010 allows publishers to create and manage ad slots, along with rules and information associated with those ad slots (e.g. size, targeting rules, hurdle rate options, allowable media types/use cases, and style sheets).

An ad campaign component 1012 allows advertisers to create and manage campaigns and bid groups including the creation and management of budgets, bids, and intent targeting rules. The ad campaign component includes a file upload feature that enables a user to upload a pre-formatted file (i.e. Excel or .csv) into the campaign database.

An ad creatives component 1014 allows for the uploading and management of ad creatives and the association of those creatives to campaigns and bid groups. The ad creatives component also includes a service for dynamically generating highly relevant landing page URLs based on advertiser specifications and/or a dynamic determination of visitor intent.

A campaign mapping component 1016 allows for the efficient translation of an SEM campaign (e.g. for AdWords) or a comparison shopping engine (CSE) campaign (e.g. for Shopping.com) into the media platform by mapping ad groups, keywords, creatives, product SKU feeds, and other information into a campaign structure and taxonomy of the media platform.

A reporting and analytics component 1018 provides detailed data and reports to all entities utilizing the media platform, including reports on A/B testing, campaign performance, page performance, available campaigns and creatives, and other information.

A matching decision engine 1020 creates a "candidate list" of eligible advertisements for a given publisher ad request based on targeting rules and a hurdle rate (set by the hurdle rate engine).

An optimization decision engine 1022 selects and ranks specific ads from the candidate list in order to optimize business results. The optimization decision engine allows users of the media platform to create and manage rules to influence optimization decisions.

A serving and logging component 1024 receives requests from publishers (including data extracted from some combination of ad tag, cookie and HTTP header info), serves ads, updates cookie information and logs outcomes such as click-through rate and return rate.

A billing component 1026 enables billing and processing of payments from advertisers to publishers through a third party. The third party may modify the payments based on commissions and other adjustments.

A user interface component 1028 allows users to access and edit data and rules through user interfaces and across multiple components of the media system.

An application programming interface 1030 (API) enables support for functionality of the components of the media system.

A relevance type mapping component 1032 streamlines the process of designating a relevance type for an ad targeting a specific intent.

Exemplary General Purpose Computer System

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISe processors, or any other type of processor. It should be appreciated that one or more of any type computer system may be used to determine ad placement according to various embodiments of the invention. Further, the system may be located on a single computer or may be distributed among a plurality of computers attached by a communications network.

A general-purpose computer system according to one embodiment of the invention is configured to perform any of the described functions, including but not limited to, determining user intent, intent stage or context, process context, hurdle rate, and obtaining and displaying advertisements based at least on the intent and hurdle rate. It should be appreciated that the system may perform other functions, including, but not limited to, storing and/or managing the historical behavior of users, monitoring the conversion of return users, maintaining a database of advertising campaigns, maintaining a database of translation maps, determining hurdle rates in real-time responsive to conversions, etc., and it should also be appreciated that the invention is not limited to having any particular function or set of functions.

Figure 11:
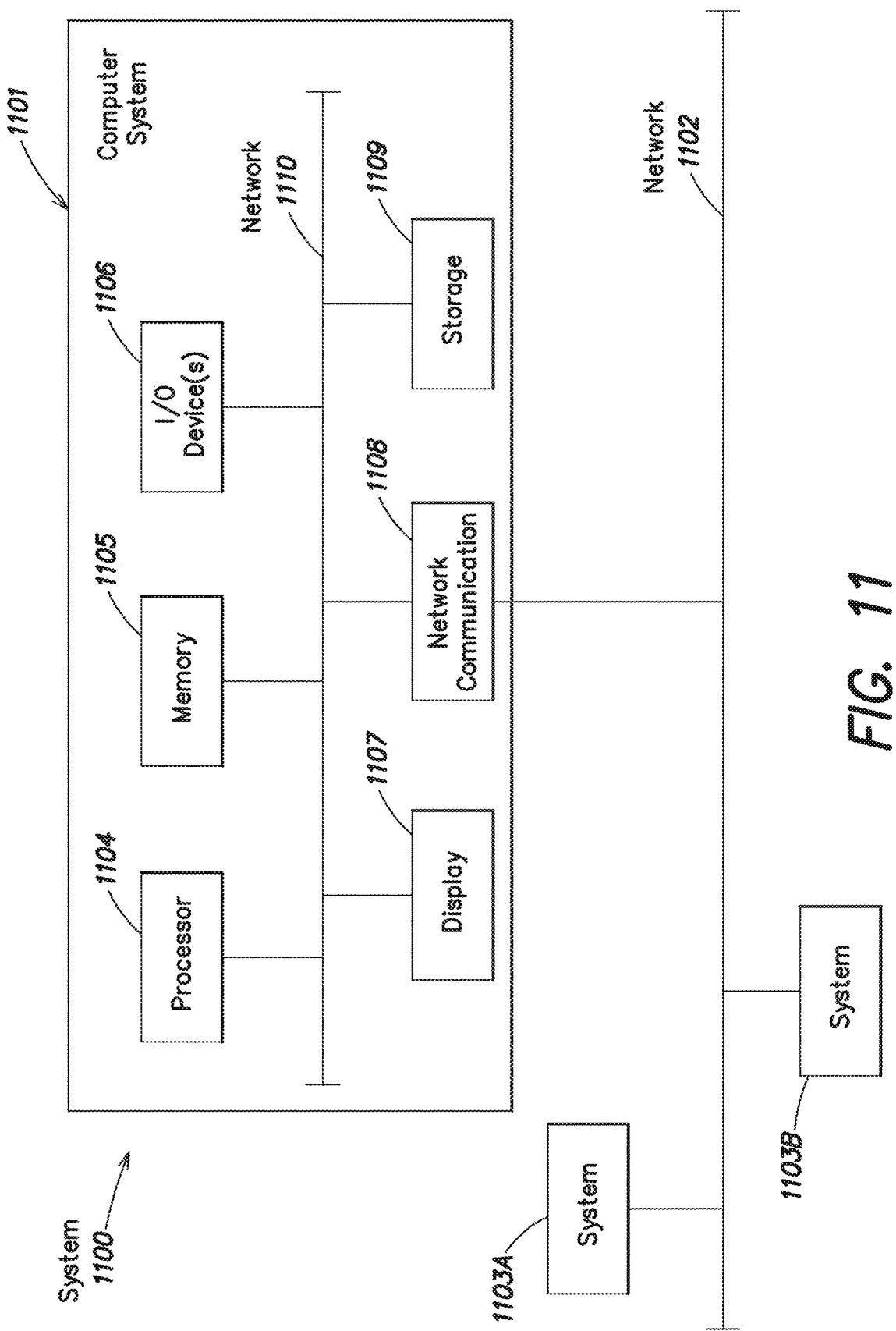
FIG. 11 is an exemplary system diagram in accordance with one embodiment of the present disclosure.

FIG. 11 shows a block diagram of a general purpose computer and network system 1100 in which various aspects of the present invention may be practiced. For example, various aspects of the invention may be implemented as specialized software executing in one or more computer systems including general-purpose computer system 1101 shown in FIG. 11. Computer system 1101 may include a processor 1104 connected to one or more memory devices 1105, such as a disk drive, memory, or other device for storing data. Memory 1105 is typically used for storing programs and data during operation of the computer system 1101. Components of computer system 1101 may be coupled by an interconnection mechanism such as network 1110, which may include one or more busses (e.g., between components that are integrated within a same machine) and/or a network (e.g., between components that reside on separate discrete machines). The interconnection mechanism enables communications (e.g., data, instructions) to be exchanged between system components of system 1101.

Computer system 1101 also includes one or more input/output (I/O) devices 1106, for example, a keyboard, mouse, trackball, microphone, touch screen, a printing device, display screen, speaker, etc. In addition, computer system 1101 may contain one or more interfaces (e.g., network communication device 1108) that connect computer system 1101 to a communication network (in addition or as an alternative to the network 1110).

Storage system 1109 typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 1109, as shown, or in memory system 1105. The processor 1104 generally manipulates the data within the integrated circuit memory 1104, and then copies the data to the medium associated with storage 1109 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1101 is shown by way of example as one type of computer system upon which various aspects of the invention may be practiced, it should be appreciated that aspects of the invention are not limited to being implemented on the computer system as shown in FIG. 11. Various aspects of the invention may be practiced on one or more computers having a different architectures or components than that shown in FIG. 11.

Computer system 1101 may be a general-purpose computer system that is programmable using a high-level computer programming language. Computer system 1101 may be also implemented using specially programmed, special purpose hardware. In computer system 1101, processor 1104 is typically a commercially-available processor such as the well-known Pentium class processor available from the Intel Corporation, although many other processors are available. Such a processor usually executes an operating system which may be, for example, the Windows-based operating systems available from the Microsoft Corporation, the MAC OS operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. It should be understood that the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. By way of further example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 1100. For instance, the system may be a distributed system (e.g., client server, multi-tier system). In one example, the system includes software processes executing on a system associated with a user (e.g., a client system). These systems may permit the user to determine a user's context and/or intent as expressed within an ecommerce site, and to provide advertisements from other ecommerce sites, and to display them to the user.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A distributed computer system for displaying advertising content in a user interface, the distributed system comprising:
 a client device having a display configured to display the user interface to a user; and
 at least one processor configured to:
  access data associated with a user who is presently interacting with the user interface displayed on the client device, wherein the data is generated based on interactions of the user with the user interface of the application;
  dynamically generate content within the user interface while the user is interacting with the user interface displayed on the client device, the dynamic generation comprising:
   determine an indication of a likelihood that the user will complete a target transaction within the user interface of the client device in the future based on the data associated with the user;
   determine whether or not to display any advertising content to the user within the user interface based on the indication of the likelihood that the user will complete the target transaction within the user interface of the client device in the future, the determining comprising:
    identifying, based on the indication of the likelihood that the user will complete the target transaction, the user as likely to complete the target transaction or unlikely to complete the target transaction; and
    determining to not display any advertising content when the user is identified as likely to complete the transaction;
    determining to display advertising content when the user is identified as unlikely to complete the transaction;
   in response to determining to display any advertising content to the user within the user interface, trigger displaying of the advertising content to the user in a portion of the user interface, the displaying comprising generating an additional interface in the display of the client device that includes visual content that is generated based on the data generated based on interactions of the user with the user interface of the application; and
   in response to determining to not display any advertising content to the user within the user interface, suppress display of advertising content to the user within the user interface.

2. The system of claim 1, wherein the data associated with the user comprises client activity signals based on real time interactions of the user with the user interface of the application.

3. The system of claim 2, wherein the client activity signals are based on real time interactions of the user with the user interface of the application while searching for one or more products or services for purchase.

4. The system of claim 1, wherein the data associated with the user comprises data indicating past activity of the user.

5. The system of claim 4, wherein the data indicating past activity of the user comprises data indicating at least one of:
 a source from which the user navigated to the user interface of the application, a method by which the user navigated to the user interface of the application, or one or more instances in which the target transaction was previously performed by the user.

6. The system of claim 5, wherein the indication of the method by which the user navigated to the user interface of the application comprises an indication of at least one of:
selection of a bookmark,
selecting a result from a search performed on a search site,
typing in a URL,
selection of an ad for the user interface of the application, or
access from an email.

7. The system of claim 5, wherein the indication of the source from which the user navigated to the user interface of the application comprises an indication of at least one of:
a category of a website from which the user navigated to the user interface of the application, and
a website separate from a website of the application.

8. The system of claim 1, wherein the at least one processor is configured to:
identify a context of the user in the user interface of the application; and
determine the indication of the likelihood that the user will complete the target transaction based on the identified context.

9. The system of claim 8 wherein the at least one processor is configured to determine, based on the context, an intent of the user to purchase a product or service.

10. The system of claim 1, wherein the additional interface comprises an interactive user interface, the interactive user interface displaying the advertising content and allowing the user to locate a product or service from a plurality of content providers.

11. The system of claim 10 wherein the interactive user interface comprises a new web page.

12. The system of claim 10, wherein the at least one processor is configured to trigger:
performing of a search for the product or service and/or the at least one related product or service; and
displaying of search results from the plurality of content providers in the interactive user interface.

13. The system of claim 1, wherein the at least one processor is configured to determine, based on a context, an intent of the user to purchase a product or service, and wherein the system further determines whether to display any advertising content in the user interface responsive to an indication of at least one of:
a type of the product or service,
a relative value of the product or service,
availability of the product or service,
a price of the product or service, or
a profit margin associated with the product or service.

14. The system of claim 1, wherein the target transaction comprises a transaction to purchase a product or service.

15. The system of claim 1, wherein the target transaction comprises clicking on at least one paid placement associated with a provider of a product or service.

16. The system of claim 1, wherein the target transaction comprises submitting user contact information within the interface.

17. The system of claim 1, wherein the at least one processor is configured to:
determine a user score based on the indication of the likelihood that the user will complete the target transaction; and
determine whether to display any advertising content to the user based on the user score.

18. The system of claim 17, wherein the at least one processor is configured to:
segment the user into a first one of a plurality of categories when user score has a first value;
segment the user into a second one of the plurality of categories when the user score has a second value;
determine to display any advertising content to the user in response to segmenting the user into the first category; and
determine to not display any advertising content to the user in response to segmenting the user into the second category.

19. The system of claim 17, wherein the at least one processor is configured to:
determine whether to display any advertising content to the user by comparing the user score to a reference value; and
trigger displaying of advertising content as part of the user interface of the application based on a result of comparing the user score to the reference value.

20. The system of claim 1, wherein the at least one processor is configured to:
in response to determining to not display any advertising content to the user, trigger reduction of visibility of advertising content to the user.

21. The system of claim 1, wherein the at least one processor is configured to modify advertising content based on the indication of the likelihood that the user will complete the target transaction.

22. The system of claim 1, wherein the at least one processor is configured to:
provide at least a portion of the data related to the user as input to a model to obtain a corresponding output; and
determine the indication of the likelihood that the user will complete the target transaction based on the output.

23. The system of claim 1, wherein the at least one processor is configured to determine whether to display any advertising content in the user interface responsive to:
determining a user status; and
determining the indication of the likelihood that the user will complete the target transaction based on the user status.

24. The system of claim 23, wherein the at least one processor is configured to compare the user status to a set of predetermined criteria and responsive to the comparison, determine whether to display any advertising content in the user interface.

25. The system of claim 1, wherein the at least one processor is configured to determine whether to display any advertising content in the user interface responsive to an indication of at least one of:
whether the user has previously completed the target transaction,
whether the user has previously visited the user interface of the application,
whether the user is logged in to the application,
whether the user is a registered user of the application,
whether the user is a member of loyalty program associated with the application
an indication of a location of the user, or
an indication of a current time of the user.

26. The system of claim 1, wherein the at least one processor is configured to determine whether to display any advertising content in the user interface responsive to an indication of at least one of:

at least one search previously performed by the user,
at least one previous purchase performed by the user,
browsing activity of the user,
progress that the user has made towards a checkout step,
presence of one or more items in a shopping cart of the user,
a URL associated with the user interface, or
a duration of time that the user has interacted with the user interface of the application.

27. The system of claim 1, wherein the at least one processor is configured to determine whether to display any advertising content in the user interface of the application based on an indication of at least one of:
 a profit that the user is expected to generate associated with completion of the target transaction,
 expected revenue associated with completion of the target transaction,
 an expected loss in profit or revenue for the target transaction if the advertising content is displayed to the user,
 an expected contribution per visitor (CPV) of the user,
 a likelihood that the user is expected to subsequently return to the user interface of the application,
 a likelihood that the user will leave the user interface of the application, or
 a lifetime value of the user.

28. The system of claim 1, wherein the at least one processor is configured to update the indication of the likelihood that the user will complete the target transaction in real time responsive to new data associated with the user as the user interacts with the application.

29. The system of claim 1, wherein the at least one processor is configured to determine whether to display any advertising content based on whether one or more advertisers are willing to pay above a threshold amount for display of the advertising content.

30. The system of claim 1, wherein the indication of the likelihood that the user will complete the target transaction comprises an indication of a likelihood that the user will complete at least one action correlated or anti-correlated with the target transaction.

* * * * *